(12) United States Patent
Wang et al.

(10) Patent No.: US 8,671,381 B1
(45) Date of Patent: Mar. 11, 2014

(54) SYSTEM FOR OPTIMIZING NUMBER OF DIES PRODUCED ON A WAFER

(71) Applicants: Peidong Wang, Suzhou (CN); Zhijun Chen, Suzhou (CN); Zhihong Cheng, Suzhou (CN); Li Ying, Suzhou (CN)

(72) Inventors: Peidong Wang, Suzhou (CN); Zhijun Chen, Suzhou (CN); Zhihong Cheng, Suzhou (CN); Li Ying, Suzhou (CN)

(73) Assignee: Freescale Semiconductor, Inc., Austin, TX (US)

( * ) Notice: Subject to any disclaimer, the term of this patent is extended or adjusted under 35 U.S.C. 154(b) by 0 days.

(21) Appl. No.: 13/723,207

(22) Filed: Dec. 21, 2012

(51) Int. Cl.
*G06F 17/50* (2006.01)

(52) U.S. Cl.
USPC .......................................... 716/135; 716/134

(58) Field of Classification Search
USPC ................................................ 716/132–135
See application file for complete search history.

(56) References Cited

U.S. PATENT DOCUMENTS

| | | | |
|---|---|---|---|
| 6,522,940 B1 | 2/2003 | Erck | |
| 7,033,847 B2 | 4/2006 | Tai | |
| 7,353,077 B2 | 4/2008 | Lin | |
| 7,882,481 B2 | 2/2011 | Hempel | |
| 8,239,788 B2 | 8/2012 | Lin | |
| 8,386,981 B1* | 2/2013 | McGowan et al. | 716/122 |
| 2004/0128630 A1* | 7/2004 | Ward et al. | 716/2 |
| 2009/0007028 A1* | 1/2009 | Hempel | 716/2 |

* cited by examiner

*Primary Examiner* — Binh Tat
(74) *Attorney, Agent, or Firm* — Charles Bergere

(57) ABSTRACT

A system for optimizing the number of dies that can be fabricated on a wafer uses a die number optimization (DNO) routine to determine a maximum number of dies for a target die area (TDA), and generate an initial result list of die shapes that have the maximum number of dies for the TDA. Optionally, a die size optimization (DSO) routine can be executed to determine a list of die shapes having a maximum die area corresponding to the maximum number of dies, a first list of optimized die shapes having a maximum area utilization (AU) for a decreased TDA, and/or a second list of optimized die shapes having a minimum AU for an increased TDA. A candidate list (CL) of the various die shapes can be generated, and entries from the CL automatically selected and/or displayed to indicate proposed wafer layouts.

24 Claims, 11 Drawing Sheets

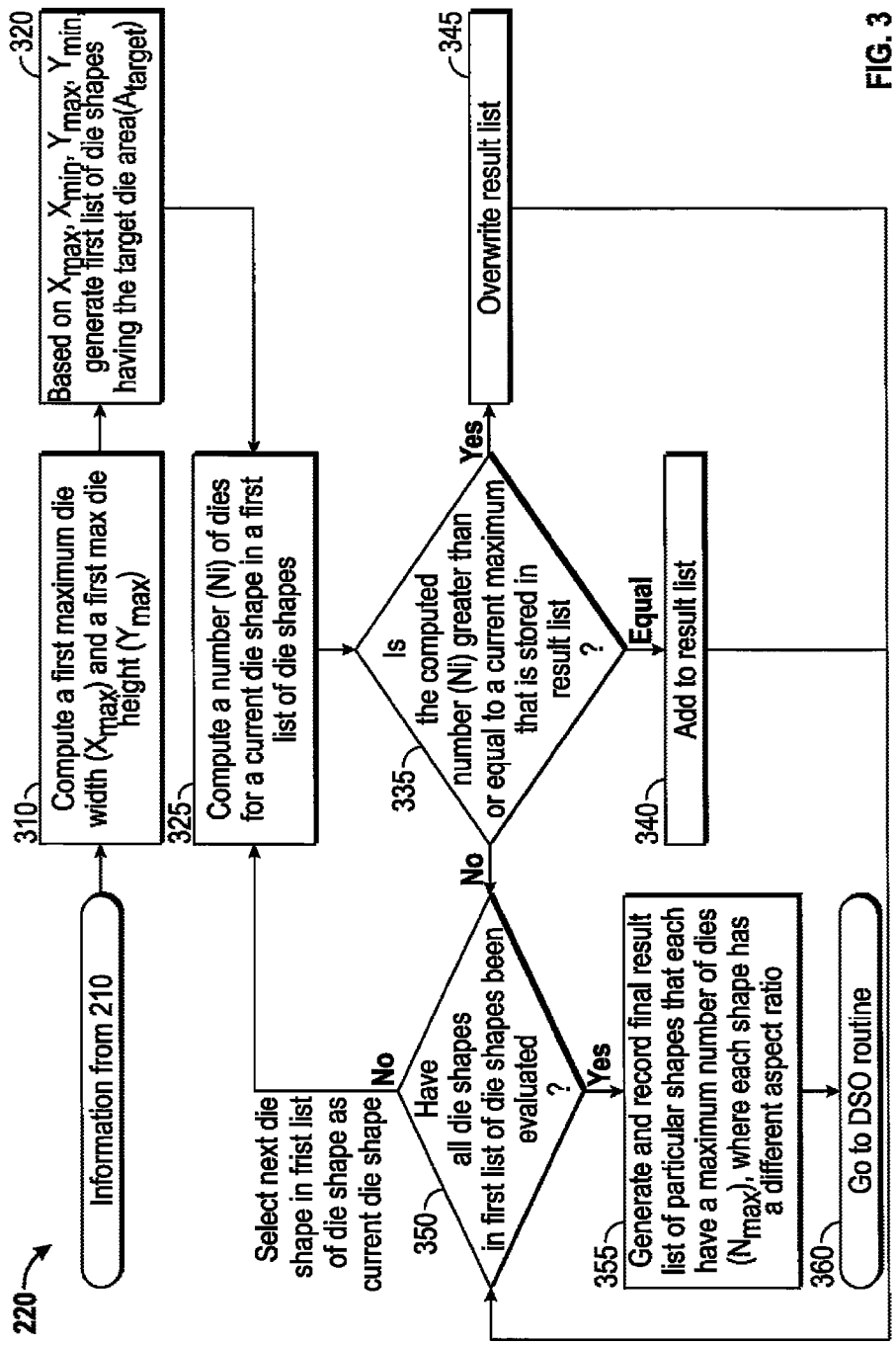

| 905 | 910 Width | 920 Height | 930 Die Area | 940 Die Number | 950 Aspect Ratio |
|---|---|---|---|---|---|
| Initial | 2692 | 2970 | 8454600 | 3342 | 1.1033 |
| DNO | 2678 | 2985 | 8454600 | 3362 | 1.1146 |
| DSO-1 | 2678 | 2986 | 8456028 | 3362 | 1.1150 |
| DSO-2 | 2674 | 2988 | 8449272 | 3368 | 1.1174 |
| DSO-3 | 2678 | 2988 | 8461544 | 3360 | 1.1158 |

FIG. 9

SYSTEM FOR OPTIMIZING NUMBER OF DIES PRODUCED ON A WAFER

BACKGROUND OF THE INVENTION

The present invention is directed to fabricating integrated circuits on a semiconductor wafer and, more particularly, to methods and systems for optimizing the number of dies that can be produced on a particular wafer.

In semiconductor design and manufacturing, it is desirable to optimize the number of dies that can fit in a wafer of a particular size or diameter. The number of dies in a wafer is often referred to in the art as dies per wafer (DPW). For any particular wafer diameter [d, mm] and target die size [S, mm$^2$], the number of dies that can be sliced out of the wafer can be estimated by the following expression:

$$DPW = d\pi \left( \frac{d}{4S} - \frac{1}{\sqrt{2S}} \right)$$

Electronic Design Automation (EDA) software refers to a category of software tools used for designing electronic systems such as integrated circuits. It would be desirable if EDA software could optimize the number of dies that can be produced or fabricated in a particular wafer.

BRIEF DESCRIPTION OF THE DRAWINGS

The present invention will hereinafter be described in conjunction with the following drawing figures, wherein like numerals denote like elements.

FIG. 3 is a flow chart that illustrates a die number optimization (DNO) routine of the computer-implemented method of FIG. 2 in accordance with an embodiment of the present invention;

FIG. 9 is a table illustrating a comparison between a number of dies per wafer for the conventional die number optimization routine and a number of dies per wafer when the die number optimization method in accordance with an embodiment of the present invention is performed.

DETAILED DESCRIPTION

The following detailed description is merely exemplary in nature and is not intended to limit the invention or the application and uses of the invention. Furthermore, there is no intention to be bound by any theory presented in the preceding background or the following detailed description.

Figure 1A:
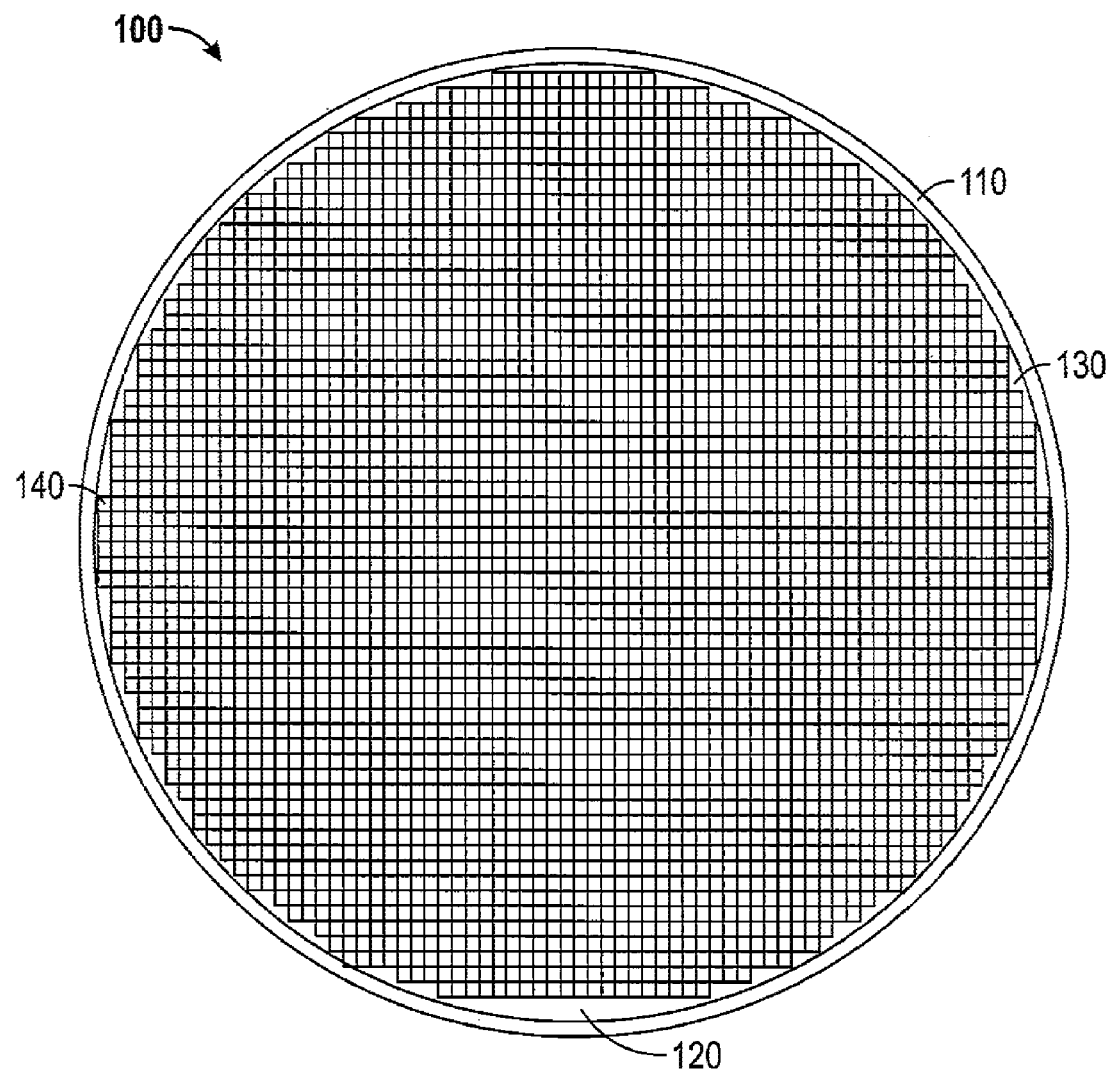
FIG. 1A is a top plan view of a wafer that includes a plurality of dies including an exemplary die.
Figure 1B:
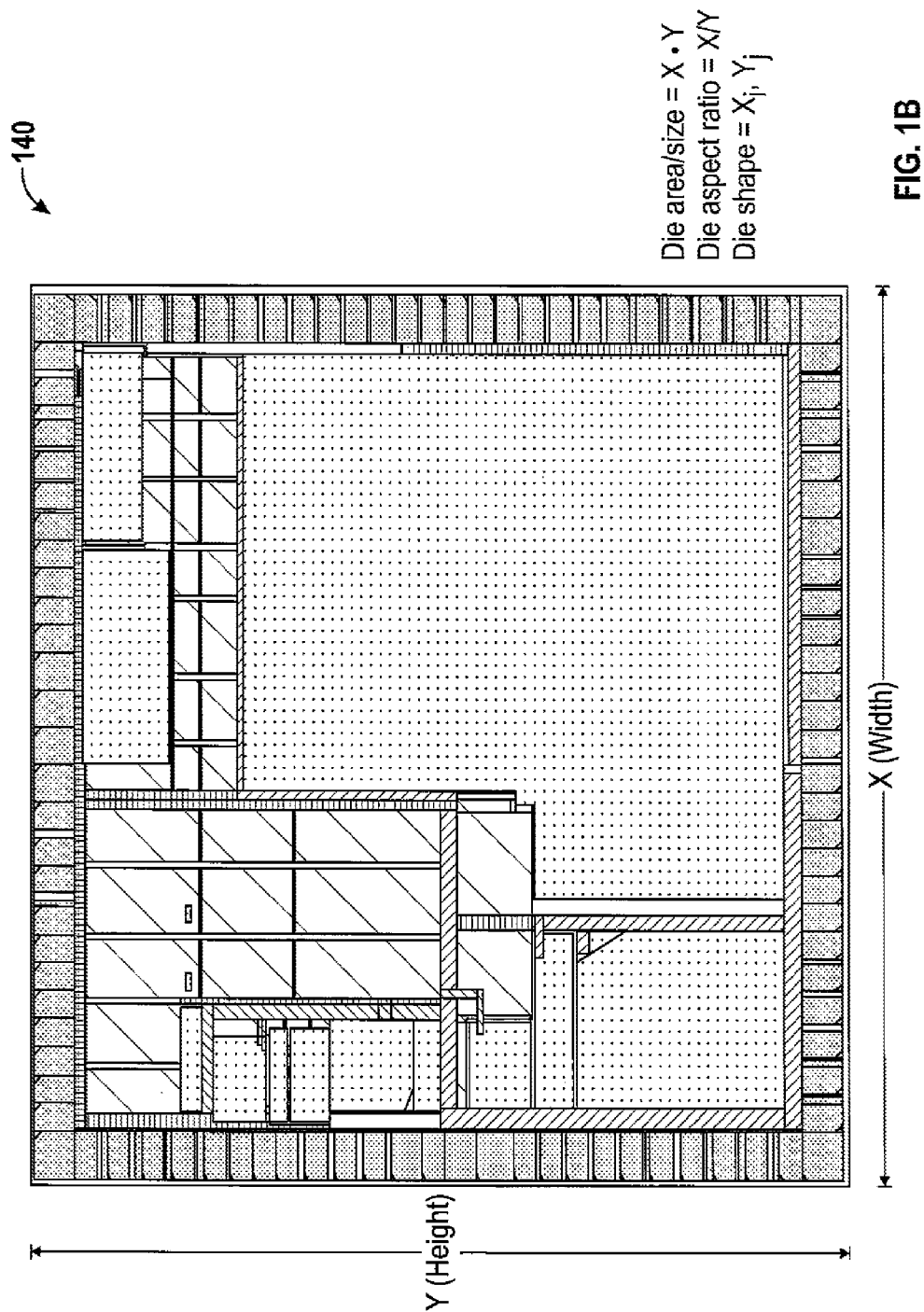
FIG. 1B is a top plan view of the exemplary die of FIG. 1A.

FIG. 1A is an exemplary top view of a wafer 100 that includes a plurality of dies including a die 140. As used herein, the term "wafer" refers to a thin slice of electronic-grade semiconductor material, such as a silicon crystal, used in the fabrication of "dies" such as integrated circuits and other microelectronic devices. As is well-known in the art, a wafer serves as the substrate that dies are fabricated in and on using fabrication processing steps such as doping or ion implantation, etching, deposition of various materials, and photolithographic patterning. In FIG. 1A each of the dies is represented by a tiny rectangle within a potential fabrication area 130 where dies can be fabricated. The rectangle 140 represents one particular die. FIG. 1B is an exemplary top view of the die 140 of FIG. 1A. As used herein, the term "die" refers to a small block of semiconducting material, on which a given functional circuit is fabricated. Typically, multiple dies are produced in and/or on the wafer 100. When the wafer 100 is cut (or "diced") into many pieces, each of these pieces is called a die. The terms "die", "microchip", "chip" and "integrated circuit" are used interchangeably herein.

As illustrated in FIG. 1A, the wafer 100 has a total wafer area ($A_{wt}$); however, a portion of the total wafer area ($A_{wt}$) is not used for fabrication of dies, and the term wafer area ($A_w$) is used herein to distinguish between to total wafer area and the potential fabrication area 130 where potential good dies can be fabricated (e.g., where commercially acceptable or viable dies can be fabricated). In other words, as used herein, the term "wafer area ($A_w$)" refers to the portion of the wafer 100 on which dies can potentially be fabricated (e.g., total wafer area ($A_{wt}$) excluding the edge band 110 and notch 120 of the wafer 100). The edge band 110 of the wafer 100 refers to a band along the outer edge of the wafer 100 where dies cannot be fabricated; the edge band 110 typically has a substantially constant edge band width ($w_{eb}$) except for in the region that is commonly referred to as the notch 120.

As is well-known in the art, the dies that make up the wafer 100 are eventually separated (or "diced"), for example, by scribing and breaking, by mechanical sawing (normally with a machine called a dicing saw) or by laser cutting. Following the dicing process the individual silicon chips are packaged (e.g., encapsulated into chip carriers).

As illustrated in FIG. 1B, the die 140 has a height (y) dimension and a width (x) dimension. As used herein with reference to a die, the term "height" refers to a dimension (y) of the die that is measured in a plane that is parallel to an upper surface of the die, and the term "width" refers to another dimension (x) of the die that is also measured in a plane that is parallel to an upper surface of the die, but that is usually substantially perpendicular to the dimension (y) of the die. In other words, the die's height (y) and width (x) dimensions are measured along a surface of the die. Its noted that in FIG. 1B, the die's height (y) and width (x) dimensions are interchangeable, and can be swapped without changing their meaning. The term "depth" or "thickness" refers to a dimension of the die (not illustrated, but into the page on FIG. 1B) that is measured in a plane that is substantially perpendicular to the height (y) and width (x) dimensions of the die.

As used herein, the term "shape" when used with reference to a die refers to a specific combination of a particular width (x) dimension and a particular height (y) dimension. Its noted that in general a die may have any shape generated by straight lines, but that they are typically either substantially rectangular-shaped or substantially square-shaped.

As used herein, the term "aspect ratio (x/y)" when used with reference to a die refers to a number that is equal to the ratio of the die's width (x) to the die's height (y).

As used herein, the term "area" when used with reference to a die refers to a product (xy) of the die's height (y) and the die's width (x). When used with reference to a die, the terms "size" and "area" are used interchangeably. As used herein the term "target die area ($A_{target}$) can refer to a user or customer defined die area.

As such, a particular die shape will have a particular area and a particular aspect ratio. However, a particular die area or a die particular aspect ratio can correspond to many different die shapes.

Unfortunately, current EDA software has no automated tool that can concurrently and reliably evaluate the number of dies that can be fabricated on a particular wafer for a given optimized die shape for each one of a number of different die sizes. Instead, designers have to evaluate how different die sizes (areas) impact the number of dies that can be fabricated on a particular wafer by randomly evaluating the number of dies per wafer that will result for different die sizes (having a fixed die shape). In doing so, the designers must compute the number of dies per wafer over and over again. This task is a very time consuming, inefficient, error prone, and labor-intensive, and does not automatically optimize the number of dies per wafer. Consequently, time delays and other inefficiencies are introduced into the overall manufacturing process. To save time and money, it would be desirable to provide an EDA software tool that can be used to make such an evaluation in an automated manner. For example, it would be desirable to provide EDA software that includes a DPW optimization component or tool that designers can use during planning and layout for estimating DPW for a number of different die sizes, and that can be used to optimize the number of dies on a wafer by optimizing die size to determine a maximum number of dies per wafer.

In accordance with some of the disclosed embodiments, computer-implemented methods and systems are provided for die area and die shape co-optimization that can be used to optimize a number of dies that can be fabricated on a particular wafer. In accordance with some of the disclosed embodiments, computer-implemented methods and systems are also provided that can also be used to further optimize die size and number of dies together so that utilization of wafer area ($A_w$) can be optimized.

Figure 2:
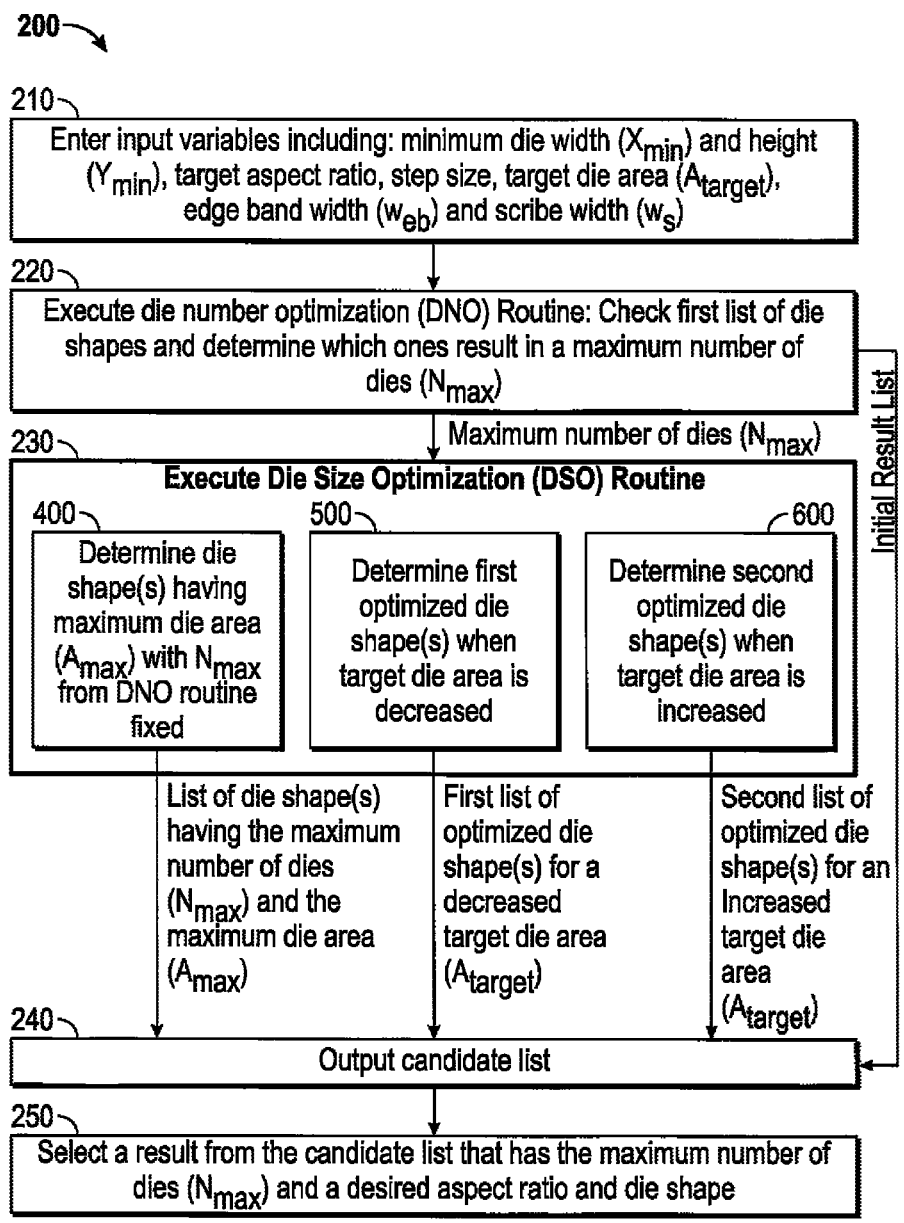
FIG. 2 is a flow chart that illustrates a computer-implemented method for optimizing the number of dies that can be fabricated on a wafer in accordance with an embodiment of the present invention.

FIG. 2 is a flowchart that illustrates a computer-implemented method 200 for optimizing a number of dies that can be fabricated on a wafer in accordance with some of the disclosed embodiments.

Method 200 begins at 210, when input variables are input. As used herein, the term "input variables" can be used to refer to user-defined die and wafer dimensions. In one embodiment, the input variables can include the die dimensions, which can include a minimum die width ($x_{min}$), a minimum die height ($y_{min}$), a target aspect ratio, step size, and a target die area ($A_{target}$), for example, and a wafer area ($A_w$), an edge band width ($w_{eb}$), and a scribe width ($w_s$) of the scribe lines between the dies. The step size is used for creation of each shape list. The step size is used to specify the minimal offset between the width (x) and height (y) values in a shape list.

At 220, a die number optimization (DNO) routine 220 is executed to determine a maximum number of dies ($N_{max}$) for the target die area ($A_{target}$). As will be described in greater detail below with reference to FIG. 3, the DNO routine 220 includes iteratively checking each die shape in a first list of die shapes to determine which ones of the die shapes have the maximum number of dies ($N_{max}$) for the target die area ($A_{target}$). The die shapes have the maximum number of dies ($N_{max}$) for the target die area ($A_{target}$) are added to an initial result list.

At 230, as will be described in greater detail below with reference to FIGS. 4-6, a die size optimization (DSO) routine 230 is executed to determine: (a) a list of die shapes having a maximum die area ($A_{max}$) corresponding to the maximum number of dies ($N_{max}$), (b) a first list of optimized die shapes, which have a maximum area utilization (AU), for a decreased target die area ($A_{target}$), and (c) a second list of optimized die shapes, which have a minimum area utilization (AU), for an increased target die area ($A_{target}$).

At 240, entries from the initial result list that was generated at 220, and optionally entries in each of the three lists (that were generated at 230) are compiled and output as entries in a candidate list, for example, on a computer display or other medium so that they can be evaluated by a user. Thus, in one embodiment, the candidate list includes a plurality of entries from (1) the initial result list of die shapes that have the maximum number of dies ($N_{max}$) for the target die area ($A_{target}$) (that was generated during the DNO routine at 220), (2) the list of die shapes having the maximum die area ($A_{max}$) corresponding to the maximum number of dies ($N_{max}$) (that was generated during the DSO routine at 230/400), (3) the first list of optimized die shapes (that was generated during the DSO routine at 230/500), and (4) the second list of optimized die shapes (that was generated during the DSO routine at 230/600). In one exemplary implementation, each entry in the candidate list can include, for example, die width (x), die height (y), die area (x·y), die aspect ratio (x/y), and die number (or "number of dies"). An example of such a candidate list will be described below with reference to FIG. 9. The candidate list allows for a variety of different die shapes to be evaluated to determine which one will yield a desired number of dies per wafer (e.g., the maximum number of dies ($N_{max}$) on the wafer).

In some scenarios, the candidate list will have multiple entries that all have the same maximum number of dies ($N_{max}$) on the wafer. When there is more than one entry having the same maximum number of dies ($N_{max}$) on the wafer, at 250, one of the entries from the candidate list can be selected automatically by a computer or by a user. In some embodiments, the selected entry can be, for example, the entry that has the maximum number of dies ($N_{max}$) on the wafer, and a desired aspect ratio and/or desired die shape, etc. In addition, in some embodiments, text can be included on the display that indicates a proposed wafer layout corresponding to one of the entries from the candidate list. In one implementation, the proposed wafer layout can include a suggested die area ($x_s \cdot y_s$), a suggested die height ($x_s$), a suggested die width ($y_s$), a suggested die aspect ratio ($x_s/y_s$), and the maximum number of dies ($N_{max}$). In addition, in some implementations, an image that includes a wafer having the proposed wafer layout can also be displayed.

FIG. 3 is a flowchart that illustrates a die number optimization (DNO) routine 220 of the computer-implemented method 200 of FIG. 2 in accordance with some of the disclosed embodiments. As noted above, the DNO routine 220 involves iteratively checking each die shape in the first list of die shapes to determine which ones of the die shapes have the maximum number of dies ($N_{max}$) for the target die area ($A_{target}$). One exemplary embodiment of the DNO routine will now be described with reference to FIG. 3.

The DNO routine 220 begins at 310, a first maximum die width ($x_{max}$) and a first maximum die height ($y_{max}$) can be computed. In one embodiment, the first maximum die width ($x_{max}$) is computed by dividing the target die area ($A_{target}$) by the minimum die width ($x_{min}$), and the first maximum die height ($y_{max}$) is computed by dividing the target die area ($A_{target}$) by the minimum die height ($y_{min}$).

Based on the minimum die width ($x_{min}$), the minimum die height ($y_{min}$), the maximum die width ($x_{max}$) and the maximum die height ($y_{max}$), at 320, a first list of die shapes that have the target die area ($A_{target}$) can be generated. For example, in one embodiment, the first list of die shapes is generated by creating a set of values within the range $\{x_{min} \ldots x_{max}\}$ that are bound by the minimum die width ($x_{min}$) and the maximum die width ($x_{max}$) creating another set of values with another range $\{y_{min} \ldots y_{max}\}$ that are bound by the minimum die height ($y_{min}$) and the maximum die height ($y_{max}$), and then computing different combinations of widths and heights within these ranges or die shapes that have the target die area ($A_{target}$). The number of die shapes in the first list can vary depending on the implementation, and any degree of granularity for the width/height combinations that is desired can be utilized.

Prior to 325, a "next" die shape in the first list of die shapes is selected as the current die shape (to be evaluated). During the first iteration of the DNO routine 220 the current die shape is the first die shape in the first list. At 325, a number (Ni) of dies for that current die shape (that is presently selected from the first list of die shapes) is computed. The computation at 325 can also be referred to as a potential die per wafer (PDPW) computation routine.

At 335, it is determined whether the computed number (Ni) of dies for the current die shape is greater than or equal to a current maximum die number ($N_{max}$) stored in a result list.

When the computed number (Ni) of dies for the current die shape is determined (at 335) to be equal to the current maximum die number ($N_{max}$) stored in the result list, then at 340, the current die shape, the computed number (Ni) of dies for the current die shape, and a current aspect ratio of the current die shape can be added to a result list. The DNO routine 220 then proceeds to 350, where it is determined whether all die shapes in the first list of die shapes been evaluated.

By contrast, when the computed number (Ni) of dies for the current die shape is determined (at 335) to be greater than the current maximum die number ($N_{max}$) stored in the result list, then at 345, the result list is cleared of all entries (or reset), and the current die shape, the computed number (Ni) of dies for the current die shape, and the current aspect ratio of the current die shape are added to the result list. The DNO routine 220 then proceeds to 350, where it is determined whether all die shapes in the first list of die shapes have been evaluated.

When the computed number (Ni) of dies for the current die shape is determined (at 335) to be less than the current maximum die number ($N_{max}$) stored in the result list, then the DNO routine 220 proceeds to 350, where it is determined whether all die shapes in the first list of die shapes have been evaluated.

When it is determined, at 350, that all die shapes in the first list of die shapes have not yet been evaluated, the next die shape in the first list is selected as the current die shape, and the DNO routine returns to 325 for another iteration. This iterative processing continues until it is determined that all die shapes in the first list of die shapes have been evaluated (at 350) at which point the DNO routine 220 proceeds to 355.

At 355, the result list is recorded as a final result list. The final result list can include one or more entries, wherein each entry comprises: a particular die shape for that entry, the maximum number of dies ($N_{max}$), and a particular aspect ratio for that entry.

The DNO routine 220 is complete at 360, and the method 200 then proceeds to execute the DSO routine 230. As will be explained below with reference to FIGS. 4-6, the DSO routine 230 may include three processes or routines that can be executed in parallel in one embodiment.

Figure 4A:
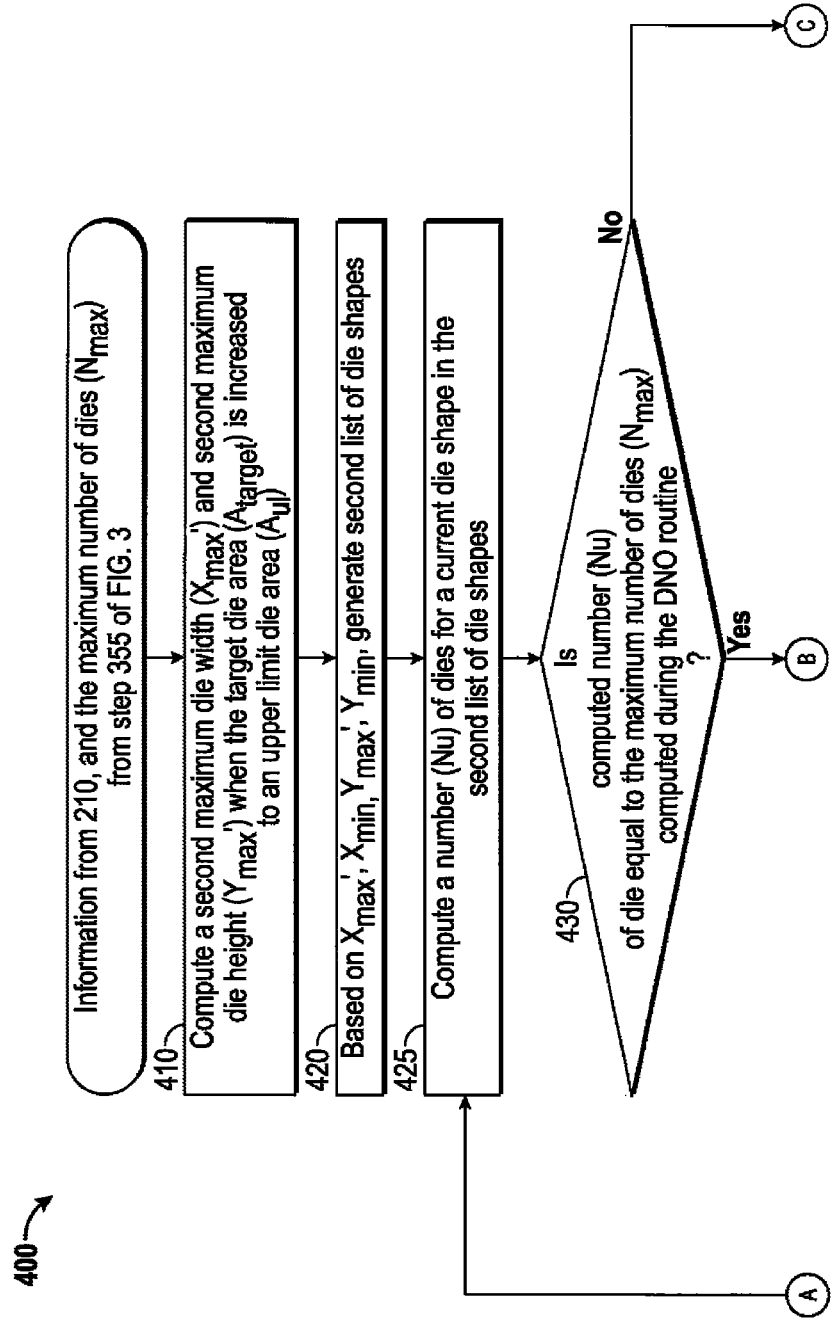
FIGS. 4A and 4B depict a flow chart that illustrates a die area maximization routine of a die size optimization (DSO) routine of the computer-implemented method of FIG. 2 in accordance with an embodiment of the present invention.
Figure 4B:
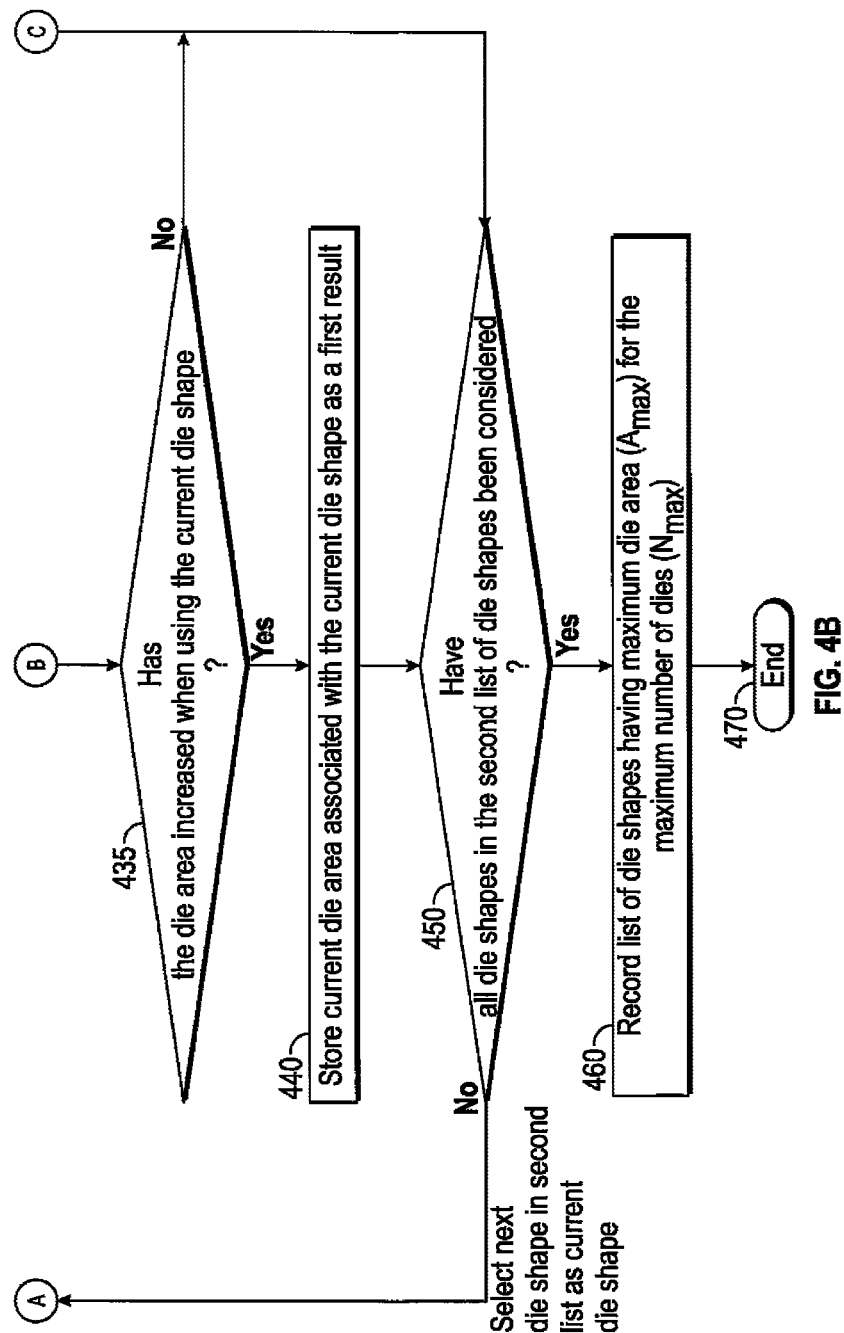

FIG. 4 is a flowchart that illustrates a routine 400 of the die size optimization (DSO) routine 230 of the computer-implemented method 200 of FIG. 2 in accordance with some of the disclosed embodiments. As will be explained in greater detail below, the routine 400 determines, while holding the maximum number of dies ($N_{max}$) determined during the DNO routine 220 at a fixed number, a list of die shapes having a maximum die area ($A_{max}$) corresponding to the maximum number of dies ($N_{max}$).

Preliminarily, it is noted that the routine 400 receives at least some of the input variables that were input at 210 of FIG. 2 (e.g., the minimum die width ($x_{min}$) and minimum die height ($y_{min}$), step size (e.g., the minimal offset between the width (x) and height (y) values), target die area ($A_{target}$)), and the maximum number of dies ($N_{max}$) specified in final result list generated at step 355 of the DNO routine 220.

The routine 400 begins at 410, where a second maximum die width ($x_{max}'$) and a second maximum die height ($y_{max}'$) are computed based on an upper limit die area ($A_{ul}$), the minimum die width ($x_{min}$) and the minimum die height ($y_{min}$). In one embodiment, the upper limit die area ($A_{ul}$) can be computed based on the target die area ($A_{target}$) by increasing the target die area ($A_{target}$) by a first scaling factor (e.g., a number greater than one) to an upper limit or "maximum." For example, in one implementation the target die area ($A_{target}$) can be multiplied by a first scaling factor of 1.5 to increase the target die area ($A_{target}$) by 50%. In one embodiment, the second maximum die width ($x_{max}'$) is computed by dividing the upper limit die area ($A_{ul}$) by the minimum die width ($x_{min}$) and the second maximum die height ($y_{max}'$) is computed by dividing the upper limit die area ($A_{ul}$) by the minimum die height ($y_{min}$).

Based on the minimum die width ($x_{min}$), the minimum die height ($y_{min}$), the second maximum die width ($x_{max}'$) and the second maximum die height ($y_{max}'$), at 420, a second list of die shapes that have the upper limit die area ($A_{ul}$) is generated. For example, in one embodiment, the second list of die shapes is generated by creating a set of values within the range $\{x_{min} \ldots x_{max}'\}$ that are bound by the minimum die width ($x_{min}$) and the second maximum die width ($x_{max}'$), creating another set of values with another range $\{y_{min} \ldots y_{max}'\}$ that are bound by the minimum die height ($y_{min}$) and the second maximum die height ($y_{max}'$), and then computing different combinations of widths and heights within these ranges or die shapes that have the upper limit die area ($A_{ul}$). The number of die shapes in the second list can vary depending on the implementation, and any degree of granularity for the width/height combinations that is desired can be utilized.

As will now be explained with reference to 425 through 460, the second list of die shapes can then be iteratively evaluated to which one(s) have a maximum die area ($A_{max}$) that corresponds to the maximum number of dies ($N_{max}$) that was computed during the DNO routine 220.

Prior to 425, a "next" die shape in the second list of die shapes is selected as the current die shape (to be evaluated), and at 425, a number (Nu) of dies for that current die shape is computed. During the first iteration of the DNO routine 220 the current die shape is the first die shape in the second list. The computation at 425 can also be referred to as a potential die per wafer (PDPW) computation routine.

At 430, it is determined whether the computed second number (Nu) of dies for the current die shape is equal to the maximum number of dies ($N_{max}$) (i.e., that was computed during the DNO routine 220). When the computed second number (Nu) of dies for the current die shape is determined (at 430) not to be equal to the maximum number of dies ($N_{max}$), the routine 400 proceeds to 450, where it is determined whether all die shapes in the second list of die shapes have been evaluated. When it is determined at 450 that all die shapes in the second list of die shapes have not yet been evaluated, the next die shape in the second list of die shapes is selected as the current die shape, and the routine 400 returns to 425 to begin another iteration.

When the computed second number (Nu) of dies for the current die shape is determined (at 430) to be equal to the maximum number of dies ($N_{max}$) (i.e., that was computed during the DNO routine 220), then the routine 400 proceeds to 435, where it is determined whether current die area has increased in comparison to the target die area ($A_{target}$) when using the current die shape.

When the current die area is determined (at 435) not to have increased in comparison to the target die area ($A_{target}$) when using the current die shape, then the routine 400 proceeds to 450, where it is determined whether all die shapes in the second list of die shapes have been evaluated.

When the current die area is determined (at 435) to have increased in comparison to the target die area ($A_{target}$) when using the current die shape, then the routine 400 proceeds to 440, where a first result is stored in a list of die shapes having a maximum die area ($A_{max}$) corresponding to the maximum number of dies ($N_{max}$). The first result is the current die area associated with the current die shape. The routine 400 then proceeds to 450, where it is determined whether die shapes in the second list of die shapes have been evaluated.

When it is eventually determined at 450 that all die shapes in the second list of die shapes have been evaluated, the routine 400 proceeds to 460, where the list of die shapes having the maximum die area ($A_{max}$) is recorded. Each die shape in the list of die shapes having the maximum die area ($A_{max}$) also have the maximum number of dies ($N_{max}$) that was computed during the DNO routine 220.

Figure 5:
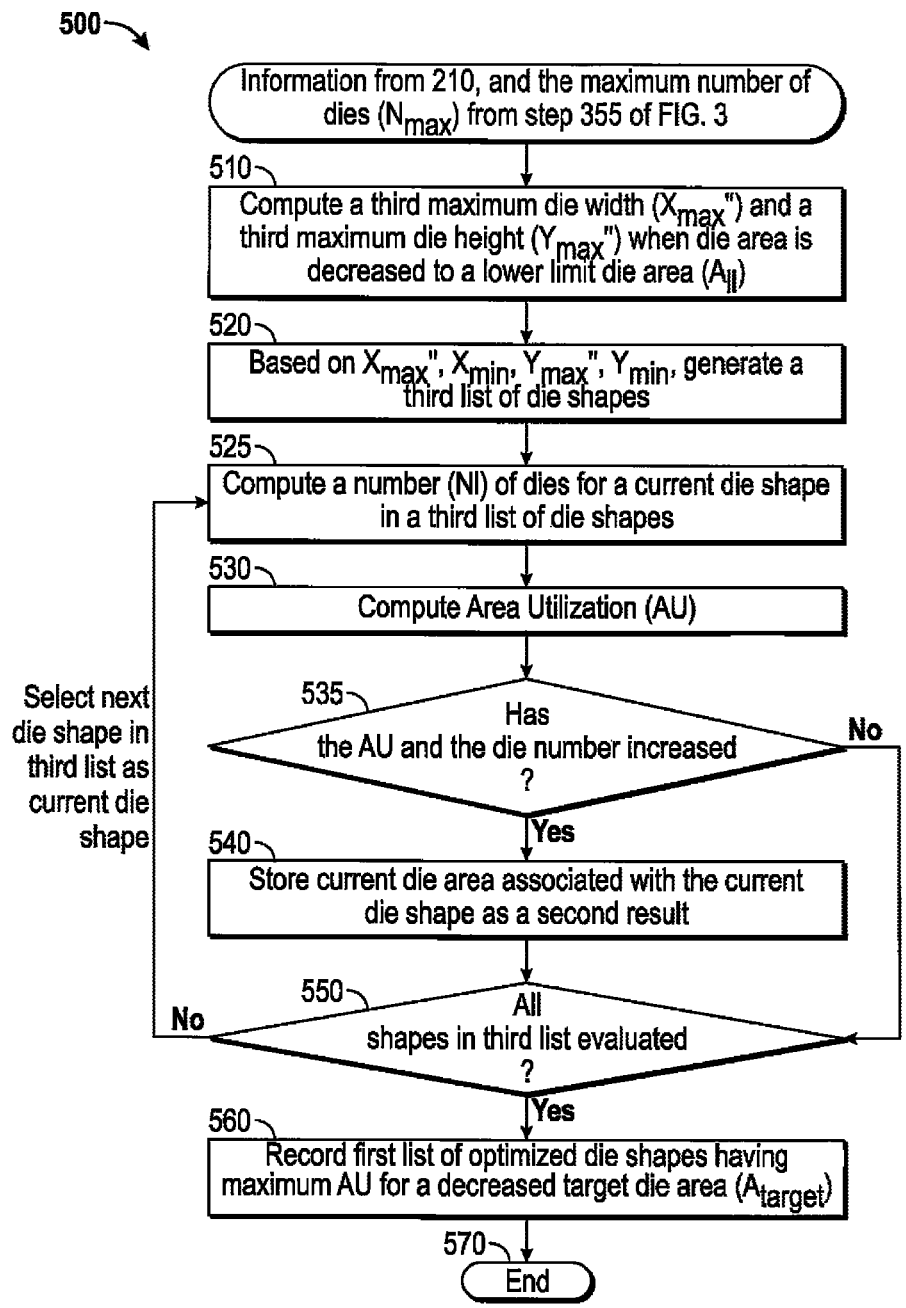
FIG. 5 is a flow chart that illustrates a second routine of the DSO routine of the computer-implemented method of FIG. 2 in accordance with an embodiment of the present invention.

FIG. 5 is a flowchart that illustrates a second routine 500 of the die size optimization (DSO) routine 230 of the computer-implemented method 200 of FIG. 2 in accordance with some of the disclosed embodiments.

Preliminarily, it is noted that the second routine 500 receives at least some of the input variables that were input at 210 of FIG. 2 (e.g., the minimum die width ($x_{min}$) and minimum die height ($y_{min}$), step size, target die area ($A_{target}$)), and the maximum number of dies ($N_{max}$) specified in final result list generated at step 355 of the DNO routine 220.

At 510, the target die area ($A_{target}$) is decreased and a third maximum die width ($x_{max}"$) and a third maximum die height ($y_{max}"$) are computed. For example, in one embodiment, the target die area ($A_{target}$) can be multiplied by a second scaling factor (e.g., a number less than one) to compute a decreased target die area ($A_{target}$) that will be referred to below as a lower limit die area ($A_{ll}$). For example, in one implementation, where the designer decides that the target die area ($A_{target}$) should be decreased by 50%, the second scaling factor would be 0.5, which is the lower limit or minimum die area to be evaluated. Once the lower limit die area ($A_{ll}$) has been computed, the third maximum die width ($x_{max}"$) can then be computed by dividing the lower limit die area ($A_{ll}$) by the minimum die width ($x_{min}$), and the third maximum die height ($y_{max}"$) can then be computed by dividing the lower limit die area ($A_{ll}$) by the minimum die height ($y_{min}$).

At 520, a third list of die shapes that have the lower limit die area ($A_{ll}$) is generated based on the minimum die width ($x_{min}$), the minimum die height ($y_{min}$), the third maximum die width ($x_{max}"$) and the third maximum die height ($y_{max}"$). For example, in one embodiment, the third list of die shapes is generated by creating a set of values within the range $\{x_{min} \ldots x_{max}"\}$ that are bound by the minimum die width ($x_{min}$) and the third maximum die width ($x_{max}"$), creating another set of values with another range $\{y_{min} \ldots y_{max}"\}$ that are bound by the minimum die height ($y_{min}$) and the third maximum die height ($y_{max}"$), and then computing different combinations of widths and heights within these ranges or die shapes that have the lower limit die area ($A_{ll}$). The number of die shapes in the third list can vary depending on the implementation, and any degree of granularity for the width/height combinations that is desired can be utilized.

As will now be described below with reference to 525-560, the third list of die shapes that have the lower limit die area ($A_{ll}$) can then be evaluated to determine which ones have the maximum area utilization (AU) in view of the lower limit die area ($A_{ll}$).

Prior to 525, a "next" die shape in the third list of die shapes is selected as the current die shape (to be evaluated), and at 525, a number (Nl) of dies is computed for the current die shape.

At 530, a first area utilization value is computed for the current die shape, and then at 535, it is determined whether both the first area utilization value and the computed number (Nl) of dies for the current die shape have increased from previously stored values. In one exemplary embodiment, the area utilization value can be computed per equation (1) as follows:

$$AU = \frac{\Delta DieNumber}{\Delta Die\ Area} = \frac{|\text{current die number} - \text{maximum die number}|}{|\text{current die area} - \text{target die area}|} \quad (1)$$

When it is determined, at 535, that the first area utilization value and the computed number (Nl) of dies for the current die shape have not increased from previously stored values, at 550, it is determined whether all die shapes in the third list of die shapes have been evaluated.

When it is determined, at 535, that both the first area utilization value and the computed number (Nl) of dies for the current die shape have increased from previously stored values, then at 540, the current die area associated with the current die shape is stored as a second result. Then at 550, it is determined whether all die shapes in the third list of die shapes have been evaluated.

When it is determined at 550 that all die shapes in the third list of die shapes have not yet been evaluated, the next die shape in the third list is selected as the current die shape and another iteration begins at 525. This iterative processing at 525 through 540 is repeated per FIG. 5 until all die shapes in the third list of die shapes have been evaluated.

When it is determined at 550 that all die shapes in the third list of die shapes have been evaluated, at 560, the second results that are presently stored are recorded as the first list of optimized die shapes. This first list of optimized die shapes are the ones of the third list of die shapes (from 520) that have been determined to have the maximum area utilization (AU).

Figure 6:
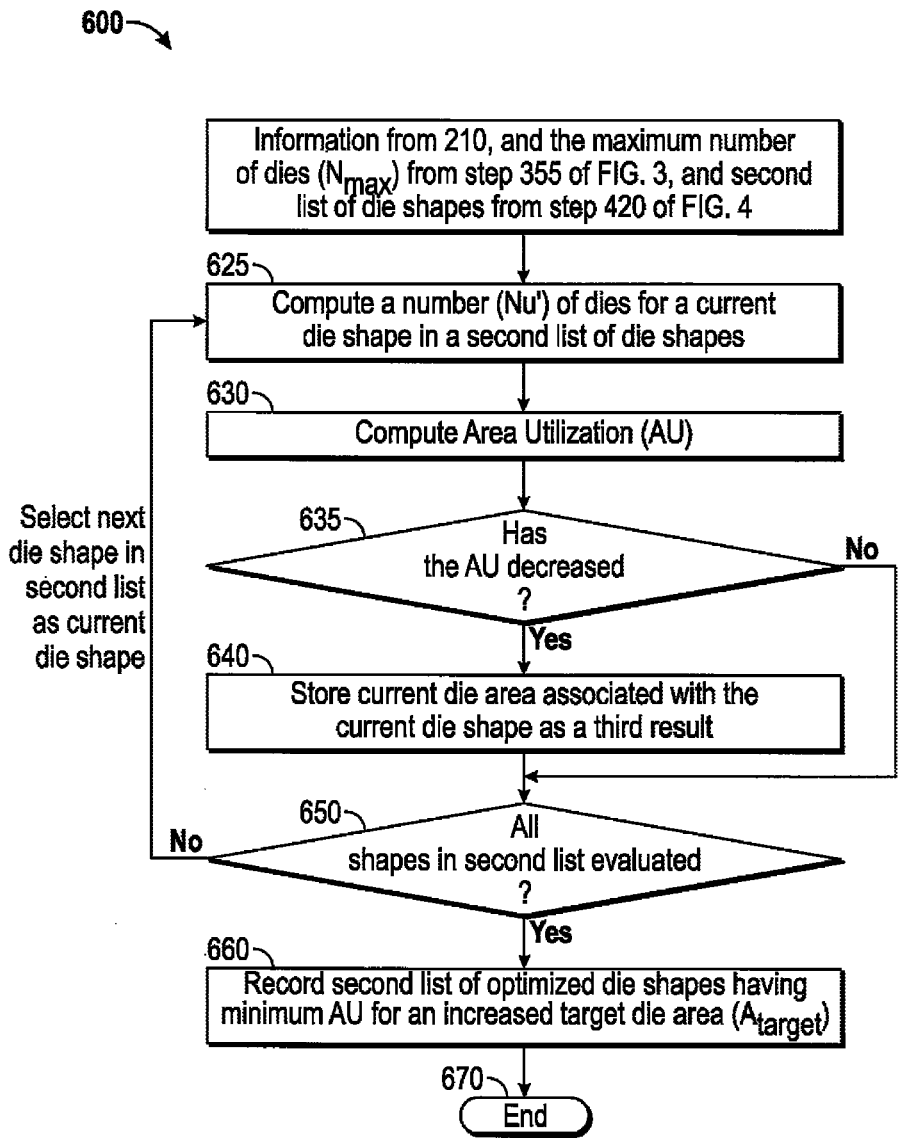
FIG. 6 is a flow chart that illustrates a third routine of the DSO routine of the computer-implemented method of FIG. 2 in accordance an embodiment of the present invention.

FIG. 6 is a flowchart that illustrates a third routine 600 of the die size optimization (DSO) routine 230 of the computer-implemented method 200 of FIG. 2 in accordance with some of the disclosed embodiments.

Preliminarily, it is noted that the third routine 600 receives at least some of the input variables that were input at 210 of FIG. 2 (e.g., the minimum die width ($x_{min}$) and minimum die height ($y_{min}$), step size, target die area ($A_{target}$)), the maximum number of dies ($N_{max}$) specified in final result list generated at step 355 of the DNO routine 220, and the second list of die shapes that was generated at step 420 of FIG. 4.

Prior to 625, a "next" die shape in the second list of die shapes is selected as the current die shape (to be evaluated), and at 625, a number (Nu') of dies for a current die shape in the second list of die shapes is computed.

At 630, a second area utilization value for the current die shape is computed using equation (1) above.

At 635, it is determined whether the second area utilization value for the current die shape has decreased from previously stored values.

When it is determined, at 635, that the second area utilization value for the current die shape has decreased from previously stored value, at 650, it is determined whether all die shapes in the second list of die shapes have been evaluated.

When it is determined, at 635, that the second area utilization value for the current die shape has decreased from previously stored values, at 640, the current die area associated with the current die shape is stored as a third result, and it is determined at 650, whether all die shapes in the second list of die shapes have been evaluated.

When it is determined (at 650) that all die shapes in the second list of die shapes have not yet been evaluated, the next die shape in the second list of die shapes is selected as the current die shape, and the routine 600 returns to 625 to begin another iteration. This iterative processing at 625 through 640 is repeated per FIG. 6 until all die shapes in the second list of die shapes have been evaluated.

When it is determined (at 650) that all die shapes in the second list of die shapes have been evaluated, the third results that are presently stored can be recorded at 660, as the second list of optimized die shapes. The second list of optimized die shapes are the ones of the second list of die shapes (from 420 of FIG. 4) that have been determined to have the minimum area utilization (AU).

Figure 7:
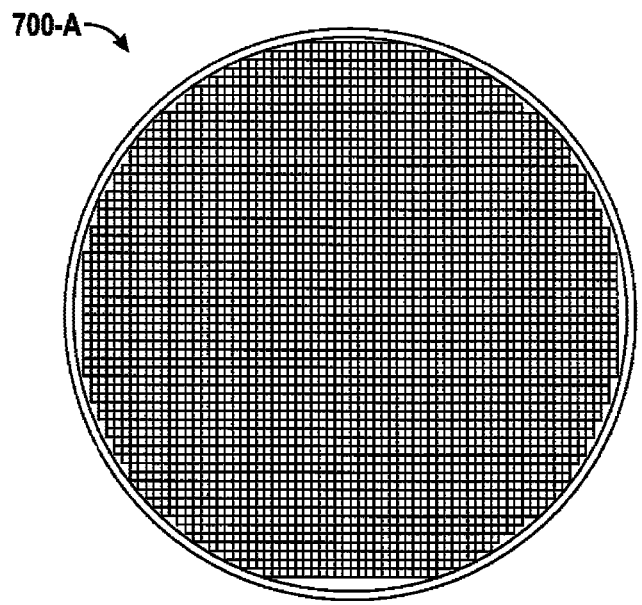
FIG. 7 is a top plan view of a wafer when a conventional die number optimization routine is performed.

FIG. 7 is an exemplary top view of a wafer 700-A when a conventional die number optimization routine is performed. The wafer 700-A includes 3342 dies.

Figure 8:
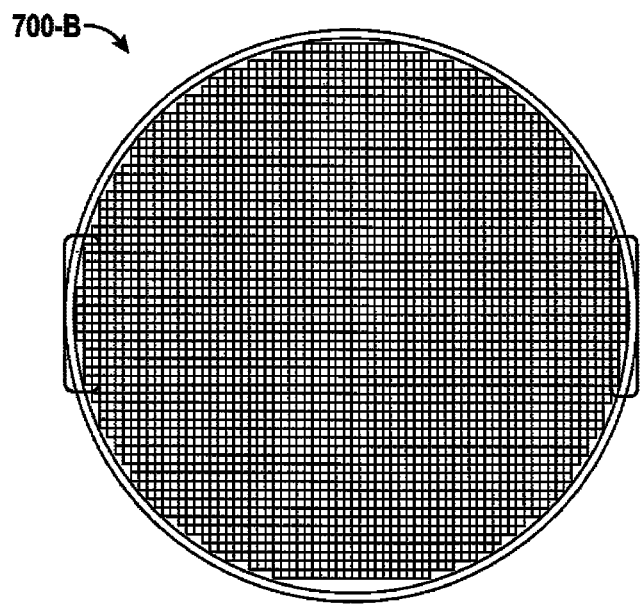
FIG. 8 is a top plan view of the wafer of FIG. 7 when a method for optimizing the number of dies is performed in accordance with an embodiment of the present invention.

FIG. 8 is an exemplary top view of the same wafer 700-B of FIG. 7 when the method 200 for optimizing a number of dies is performed in accordance with some of the disclosed embodiments. The wafer 700-B now includes 3368 dies, or 26 additional dies in the same wafer 700-A.

FIG. 9 is an exemplary table 900 illustrating a comparison between a number of dies per wafer for the conventional die number optimization routine (FIG. 7) and a number of dies per wafer when the method 200 for optimizing a number of dies is performed in accordance with some of the disclosed embodiments.

Column 905 of table 900 shows various optimization routines that can be performed to optimize the number of dies on a particular wafer, and row 955 of table 900 shows variables that can be computed when each of the different optimization routines are performed. Specifically, the variables in row 955 include die width (x) dimensions in column 910, die height (y) dimensions in column 920, die area (x·y) in column 930, die number in column 940, and die aspect ratio (x/y) in column 950. The table 900 includes simulation results for a conventional die number optimization routine (row 960), simulation results after the DNO routine 220 is performed (row 970), simulation results after the routine 400 (FIG. 4) of the DSO routine 230 is performed (row 972), simulation results after the second routine 500 (FIG. 5) of the DSO routine 230 is performed (row 974), simulation results after the third routine 600 of the DSO routine 230 (FIG. 6) is performed (row 976).

When the DNO routine 220 (FIG. 3) is performed (row 970), the width (x) dimension of the dies decreases and the height (y) dimension of the dies increases slightly in comparison to the values when the conventional die number optimization routine (row 960) is applied, whereas the target die area ($A_{target}$) remains fixed (i.e., does not change). As illustrated in table 900, the conventional die number optimization routine (row 960) results in having an aspect ratio of 1.1033, and 3342 die being fit into a particular wafer having a particular fabrication area. By contrast, after the DNO routine 220 is performed (row 970), 3362 die are fit into the same wafer with each of the die having as aspect ratio of 1.1146. As such, the simulation results show that implementing the DNO routine alone increases the number of dies that can be fabricated on the wafer by 0.598% in comparison to the conventional die number optimization routine (row 960).

When the routine 400 of the DSO routine 230 (FIG. 4) is performed (row 972), the width (x) dimension of the dies decreases and the height (y) dimension of the dies increases slightly in comparison to the values when the conventional die number optimization routine (row 960) is applied, and the die area also increases. As illustrated in table 900, after the routine 400 of the DSO routine 230 is performed (row 972), 3362 die are fit into the same wafer with each of the die having as aspect ratio of 1.1150. As such, the simulation results show that implementing the DNO routine along with the routine 400 of the DSO routine 230 increases the number of dies that can be fabricated on the wafer by 0.598% in comparison to the conventional die number optimization routine (row 960). In this particular example, implementing the routine 400 of the DSO routine 230 results in a negligible increase in die area (0.017%) and aspect ratio, but no increase in die number, with respect to the results produced when only the DNO routine is performed.

When the second routine 500 (FIG. 5) of the DSO routine 230 is performed (row 974), the width (x) dimension of the dies decreases and the height (y) dimension of the dies increases slightly in comparison to the values when the conventional die number optimization routine (row 960) is applied, while the die area actually decreases. As illustrated in table 900, after the second routine 500 of the DSO routine 230 is performed (row 974), 3368 die are fit into the same wafer with each of the die having a larger aspect ratio of 1.1174. As such, the simulation results show that implementing the second routine 500 of the DSO routine 230 (in conjunction with the DNO routine and the routine 400 of the DSO routine 230) the number of dies that can be fabricated on the wafer can be increased by 0.788% in comparison to the conventional die number optimization routine (row 960).

When the third routine 600 (FIG. 6) of the DSO routine 230 is performed (row 976), the width (x) dimension of the dies decreases and the height (y) dimension of the dies increases slightly in comparison to the values when the conventional die number optimization routine (row 960) is applied, while the die area increases. As illustrated in table 900, after the third routine 600 of the DSO routine 230 is performed (row 976), 3360 die are fit into the same wafer with each of the die having a larger aspect ratio of 1.1158. As such, the simulation results show that implementing the third routine 600 of the DSO routine 230 (in conjunction with the DNO routine, the routine 400 of the DSO routine 230 and the second routine 500 of the DSO routine 230), the number of dies that can be fabricated on the wafer can be increased by 0.539% in comparison to the conventional die number optimization routine (row 960).

As such, the various embodiments can allow for an increase in the number of dies that can be fabricated on a particular wafer.

It is noted that the information included in rows 970, 972, 974, 976 of the table 900 is one example of the candidate list that could be output at block 240 of FIG. 2; however, its noted that there could be multiple entries in any of the rows 970, 972, 974, 976 in other examples where multiple entries result.

Although the embodiments and implementations are described above are illustrated in terms of functional and/or logical block components (or modules) and various processing steps, it should be appreciated that such block components (or modules) may be realized by any number of hardware, software, and/or firmware components configured to perform the specified functions. As used herein the term "component" or "module" can generally refer to a device, a circuit, an electrical component, and/or a software based component for performing a task. As such, those of skill in the art will appreciate that the various illustrative logical blocks, modules, circuits, and algorithm steps described in connection with the embodiments disclosed herein may be implemented as electronic hardware, computer software, or combinations of both.

For example, the various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC.

One example a computing environment in which the disclosed embodiments may be implemented will now be described below with reference to FIG. 10.

Figure 10:
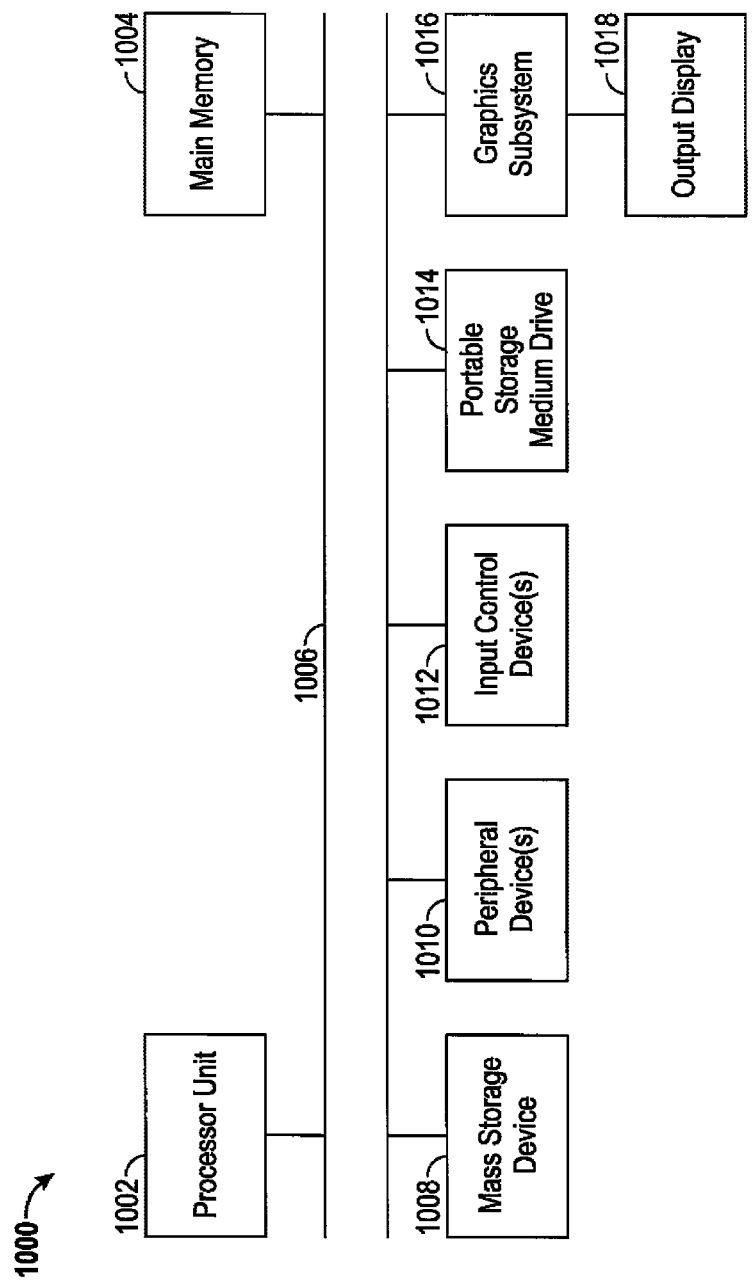
FIG. 10 is a schematic block diagram of a computer system for executing the die optimization methods and EDA tools in accordance with an embodiment of the present invention.

FIG. 10 illustrates a block diagram of a computer system 1000 for executing electronic design automation programs in accordance with various ones of the disclosed embodiments. The computer system 1000 includes a processor 1002, a main memory 1004, an interconnect bus 1006, a mass storage device 1008, peripheral device(s) 1010, input control device(s) 1012, portable storage drive(s) 1014, a graphics subsystem 1016, and a display 1018.

The processor 1002 may include a single microprocessor or a plurality of microprocessors configured as a multi-processor system.

The main memory 1004 stores, in part, instructions and data to be executed by the processor 1002. The main memory 1004 preferably includes banks of dynamic random access memory (DRAM) as well as high-speed cache memory.

For the purpose of simplicity, the components of the computer system 1000 are connected via interconnect bus 1006. However, the computer system 1000 may be connected through one or more data transport means. For example, the processor 1002 and main memory 1004 may be connected via a local microprocessor bus and mass storage device 1008, peripheral device(s) 1010, portable storage medium drive(s) 1014, and graphic subsystem 1016 may be connected via one or more input/output (I/O) buses.

Mass storage device 1008, which may be implemented with a magnetic disk drive, an optical disk drive, a solid state device, or an attachment to network storage, is non-volatile storage device for storing data, databases, and instructions, to be used by the processor 1002. In a software embodiment, mass storage device 1008 may store the software to load it into main memory 1004.

Portable storage medium drive 1014 operates in conjunction with a portable non-volatile storage medium such as a floppy disk, a compact disk read only memory (CD-ROM), or a digital versatile disk read only memory (DVD-ROM), to input and output data and code to and from the computer system 1000. In one embodiment, the software is stored on such a portable medium, and is input to computer system 1000 via portable storage medium drive 1014.

Peripheral device(s) 1010 may include any type of computer support device such as an input/output (I/O) interface, to add additional functionality to computer system 1000. For example, peripheral device(s) 1010 may include a network interface card to interface computer system 1000 to a network.

Input control device(s) 1012 provide a portion of the user interface for the computer system 1000 user. Input control device(s) 1012 may include an alphanumeric keypad for inputting alphanumeric and other key information; and a cursor control device such as a mouse, a track pad or stylus; or cursor direction keys.

In order to display textual and graphical information, computer system 1000 contains graphic subsystem 1014 and output display(s) 1018. Output display 1018 may include a cathode ray tube (CRT) display, liquid crystal display (LCD), plasma, or light emitting diode (LED) display, etc.

Graphic subsystem 1016 receives textual and graphical information and processes the information for output to display 1018.

In a software implementation, the EDA software includes a plurality of computer executable instructions, to be implemented on a computer system. Prior to loading in the computer system, the EDA software may reside as encoded information on a computer-readable tangible medium such as a magnetic floppy disk, a magnetic tape, CD-ROM, DVD-ROM, flash memory, or any other suitable computer readable medium.

In a hardware implementation, such a system may be implemented in any suitable computer based platform known in the art. For example, the system may comprise suitable storage media and one or more dedicated processors or share one or more processors executing/controlling other functions, wherein the employed processor(s) is programmably configured with processor instructions for performing the functions described herein. Suitable circuits may also be developed to execute certain aspects of these functions.

In one embodiment, a computer-implemented method is provided for optimizing a number of dies that can be fabricated on a wafer. In accordance with the computer-implemented method, input variables can be received that include: a minimum die width ($x_{min}$), a minimum die height ($y_{min}$), a target aspect ratio, a target die area ($A_{target}$), a wafer area ($A_w$), an edge band width ($w_{eb}$), and a scribe width ($w_s$). In some embodiments of the computer-implemented method, a first maximum die width ($x_{max}$) and a first maximum die height ($y_{max}$) can be computed, and the first list of die shapes that have the target die area ($A_{target}$) can be generated based on the minimum die width ($x_{min}$), the minimum die height ($y_{min}$), the maximum die width ($x_{max}$) and the maximum die height ($y_{max}$).

As part of the computer-implemented method, a die number optimization (DNO) routine can be executed to determine a maximum number of dies ($N_{max}$) for the target die area ($A_{target}$). During the DNO routine each die shape in a first list of die shapes can be iteratively checked to determine which ones of the die shapes have the maximum number of dies ($N_{max}$) for the target die area ($A_{target}$), and an initial result list of die shapes that have the maximum number of dies ($N_{max}$) for the target die area ($A_{target}$) can be generated.

For example, in one implementation of the DNO routine of the computer-implemented method, each die shape in the first list of die shapes can be iteratively checked to determine which ones of the die shapes have the maximum number of dies ($N_{max}$) for the target die area ($A_{target}$) by (a) selecting a next die shape from the first list of die shapes as a current die shape, and computing a first number (Ni) of dies for the current die shape from the first list of die shapes, and then at step (b) determining whether the computed number (Ni) of dies for the current die shape is greater than or equal to a current maximum die number ($N_{max}$) stored in a result list. When the computed first number (Ni) of dies for the current die shape is equal to the current maximum die number ($N_{max}$) stored in the result list, then at step (c) adding the computed first number (Ni) of dies for the current die shape, the current die shape and a current aspect ratio of the current die shape to the result list, and then (e) determining whether all die shapes in the first list of die shapes have been evaluated. When the computed first number (Ni) of dies for the current die shape is greater than the current maximum die number ($N_{max}$) stored in the result list, then at step (d) the result list is cleared and the computed first number (Ni) of dies for the current die shape, the current die shape and the current aspect ratio of the current die shape are added to the result list, and then at step (e) it can be determined whether all die shapes in the first list of die shapes have been evaluated.

When the computed first number (Ni) of dies for the current die shape is not greater than the current maximum die number ($N_{max}$) stored in the result list, then at step (e) it can be determined whether all die shapes in the first list of die shapes have been evaluated, and when it is determined that all die shapes in the first list of die shapes have not yet been evaluated at step (e), steps (a) through (e) can be iteratively repeated. By contrast, when it is determined that all die shapes in the first list of die shapes have been evaluated at step (e), the result list can be recorded as a final result list. The final result list comprises a plurality of entries, wherein each entry comprises: a particular die shape for that entry, the maximum number of dies ($N_{max}$), and a particular aspect ratio for that entry. The aspect ratio of each entry in the final result list is different.

In some embodiments, the computer-implemented method can also include executing a die size optimization (DSO) routine to determine (1) a list of die shapes having a maximum die area ($A_{max}$) corresponding to the maximum number of dies ($N_{max}$), (2) a first list of optimized die shapes, which have a maximum area utilization (AU), for a decreased target die area ($A_{target}$), and (3) a second list of optimized die shapes, which have a minimum area utilization (AU), for an increased target die area ($A_{target}$).

In some implementations, the DSO routine comprises a first DSO routine, a second DSO routine and a third DSO routine.

During the first DSO routine, the maximum die area ($A_{max}$) corresponding to the maximum number of dies ($N_{max}$) is determined while holding the maximum number of dies ($N_{max}$) determined during the DNO routine at a fixed number. During the first DSO routine, the target die area ($A_{target}$) can be multiplied by a first scaling factor to compute an upper limit die area ($A_{ul}$) based on the target die area ($A_{target}$), and then, based on the upper limit die area ($A_{ul}$), the minimum die width ($x_{min}$) and the minimum die height ($y_{min}$), a second maximum die width ($x_{max}'$) and a second maximum die height ($y_{max}'$) can be computed. Based on the minimum die width ($x_{min}$), the minimum die height ($y_{min}$), the second maximum die width ($x_{max}'$) and the second maximum die height ($y_{max}'$), a second list of die shapes can be generated that have an upper limit die area ($A_{ul}$). The first DSO routine can then include steps (f) through (j). At step (f) a next die shape from the second list of die shapes can be selected as a current die shape, and a second number (Nu) of dies for that current die shape can be computed. At step (g) it can then be determined whether the computed second number (Nu) of dies for the current die shape is equal to the maximum number of dies ($N_{max}$) that was computed during the DNO routine.

When the computed second number (Nu) of dies for the current die shape is determined to be not equal to the maximum number of dies ($N_{max}$) that was computed during the DNO routine, at step (j) it can be determined whether all die shapes in the second list of die shapes have been evaluated. When the computed second number (Nu) of dies for the current die shape is determined to be equal to the maximum number of dies ($N_{max}$) that was computed during the DNO routine, then at step (h) it can be determined whether current die area has increased in comparison to the target die area ($A_{target}$) when using the current die shape. When the current die area is determined not to have increased in comparison to the target die area ($A_{target}$) (when using the current die shape), then at step (j) it can be determined whether all die shapes in the second list of die shapes have been evaluated. When the current die area is determined to have increased in comparison to the target die area ($A_{target}$) (when using the current die shape), then at step (i) the current die shape can be stored as a first result in the list of die shapes having the maximum die area ($A_{max}$) and corresponding to the maximum number of dies ($N_{max}$). Then at step (j) it can be determined whether all die shapes in the second list of die shapes have been evaluated.

Whenever it is determined at step (j) that all die shapes in the second list of die shapes have not yet been evaluated, steps (f) through (j) are iteratively repeated for a next die shape from the second list of die shapes (that can be selected as a "new" current die shape). When it is determined at step (j) that all die shapes in the second list of die shapes have been evaluated, the list of die shapes having the maximum die area ($A_{max}$) that corresponds to the maximum number of dies ($N_{max}$) computed during the DNO routine can be recorded.

During the second DSO routine the target die area ($A_{target}$) can be decreased to generate a decreased target die area ($A_{target}$), and the first list of optimized die shapes, which have the maximum area utilization (AU), for the decreased target die area ($A_{target}$) can then be determined.

For example, in one embodiment, the target die area ($A_{target}$) can be multiplied by a second scaling factor to compute lower limit die area ($A_{ll}$) based on the target die area ($A_{target}$), and then a third maximum die width ($x_{max}''$) and a third maximum die height ($y_{max}''$) can be computed based on the lower limit die area ($A_{ll}$), the minimum die width ($x_{min}$) and the minimum die height ($y_{min}$). A third list of die shapes that have the lower limit die area ($A_{ll}$) can then be generated based on the minimum die width ($x_{min}$), the minimum die height ($y_{min}$), the third maximum die width ($x_{max}''$) and the third maximum die height ($y_{max}''$).

The first list of optimized die shapes, which have the maximum area utilization (AU), for the decreased target die area ($A_{target}$) can then be determined by performing steps (k) through (o) as follows. At step (k), a next die shape from the third list of die shapes can be selected as a current die shape, and a third number (Nl) of dies for the current die shape (in the third list of die shapes) can be computed. At step (l) a first area utilization value for the current die shape can be computed, and then at step (m) it can be determined whether the first area utilization value or the computed third number (Nl) of dies for the current die shape has increased from previously stored values (if any have been stored). When it is determined, at step (m), that neither the first area utilization value nor the computed third number (Nl) of dies for the current die shape has increased from previously stored values, it can be determined at step (o) whether all die shapes in the third list of die shapes have been evaluated. By contrast, when it is determined, at step (m), that either the first area utilization value or the computed third number (Nl) of dies for the current die shape has increased from previously stored values, then at step (n) the current die area associated with the current die shape can be stored as a second result. It can then be determined at step (o) whether all die shapes in the third list of die shapes have been evaluated. When it is determined at step (o) that all die shapes in the third list of die shapes have not yet been evaluated, steps (k) through (n) can be iteratively repeated. By contrast, when it is determined at step (o) that all die shapes in the third list of die shapes have been evaluated, the second results that are presently stored as can be stored as the first list of optimized die shapes. The die shapes in the first list of optimized die shapes have the maximum area utilization (AU) for the decreased target die area ($A_{target}$).

During the third DSO routine steps (p) through (t) can be iteratively performed. At step (p) a next die shape from the second list of die shapes can be selected as a current die shape, and a fourth number (Nu') of dies for the current die shape (from the second list of die shapes) can be computed. At step (q) a second area utilization value for the current die shape is computed, and at step (r) it can be determined whether the second area utilization value for the current die shape has decreased from a previously stored value (if any is/are stored). When it is determined, at step (r), that the second area utilization value for the current die shape has not decreased from the previously stored value, then at step (t) it can be determined whether all die shapes in the second list of die shapes have been evaluated. When it is determined at step (r) that all die shapes in the second list of die shapes have not yet been evaluated steps (p) through (t), can be iteratively repeated. By contrast, when it is determined, at step (r), that the second area utilization value for the current die shape has decreased from the previously stored value, then at step (s) the current die area associated with the current die shape can be stored as a third result. Then, at step (t), it can be determined whether all die shapes in the second list of die shapes have been evaluated. When it is determined at step (t) that all die shapes in the second list of die shapes have been evaluated, the third results that are presently stored can be recorded as the second list of optimized die shapes, which have the minimum area utilization (AU), for the increased target die area ($A_{target}$).

In some embodiments, a candidate list can be output. The candidate list can include one or more entries that can include, for example, die shapes from the initial result list that have the maximum number of dies ($N_{max}$) for the target die area ($A_{target}$), die shapes from the list of die shapes having the maximum die area ($A_{max}$) corresponding to the maximum number of dies ($N_{max}$), the optimized die shapes from the first list of optimized die shapes, and the optimized die shapes from the second list of optimized die shapes. One of the entries from the candidate list that will result in the maximum number of dies ($N_{max}$) on the wafer can be selected automatically as part of the computer implemented method, or by a user who inspects the candidate list.

In some embodiments, information that is generated as part of the computer-implemented method can be displayed, for example, on a graphical user interface. This information can include text that indicates a proposed wafer layout corresponding to one of the entries from the candidate list, and/or an image that includes a wafer having the proposed wafer layout. Text that indicates the proposed wafer layout can include, for example, a suggested die area ($x_s \cdot y_s$), a suggested die height ($x_s$), a suggested die width ($y_s$), a suggested die aspect ratio ($x_s/y_s$), and the maximum number of dies ($N_{max}$).

The computer-implemented methods that are described above for optimizing the number of dies that can be fabricated on a wafer can be implemented in a computer program product for use with a computer. The computer program product comprises a non-transitory computer-readable storage medium comprising computer-executable instructions stored thereon for optimizing the number of dies that can be fabricated on the wafer. In such implementations, the computer-executable instructions can perform any combination of the various steps described herein.

The computer-implemented methods and computer program products that are described above can be implemented as part of a system for performing electronic design automation tasks including optimizing the number of dies that can be fabricated on a wafer. In this case, the system comprises a computer processor, a storage memory coupled to the computer processor, an input apparatus for inputting input variables and a computer program that includes software modules including software modules that are designed to perform the computer-executable instructions that are described above.

For instance, the computer program can includes, in one implementation, a first module configured to compute a first maximum die width ($x_{max}$) and a first maximum die height ($y_{max}$ to generate a first list of die shapes that have the target die area ($A_{target}$), based on the minimum die width ($x_{min}$), the minimum die height ($y_{min}$), the maximum die width ($x_{max}$) and the maximum die height ($y_{max}$), to determine a maximum number of dies ($N_{max}$) for the target die area ($A_{target}$) by iteratively checking each die shape in a first list of die shapes to determine which ones of the die shapes have the maximum number of dies ($N_{max}$) for the target die area ($A_{target}$), and to generate an initial result list of die shapes that have the maximum number of dies ($N_{max}$) for the target die area ($A_{target}$); and a second module configured to determine (1) a list of die shapes having a maximum die area ($A_{max}$) corresponding to the maximum number of dies ($N_{max}$), (2) a first list of optimized die shapes, which have a maximum area utilization (AU), for a decreased target die area ($A_{target}$), and (3) a second list of optimized die shapes, which have a minimum area utilization (AU), for an increased target die area ($A_{target}$). The computer program can optionally include a third module configured to generate a candidate list (as described above). Further, in some implementations, the system can include a display for displaying one or more of: a proposed wafer layout corresponding to one of the entries from the candidate list, the proposed wafer layout comprising: a suggested die area ($x_s \cdot y_s$), a suggested die height ($x_s$), a suggested die width ($y_s$), a suggested die aspect ratio ($x_s/y_s$), and the maximum number of dies ($N_{max}$); and an image that includes a wafer having the proposed wafer layout In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the disclosed embodiments as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

The invention claimed is:

1. A computer-implemented method for optimizing a number of dies that can be fabricated on a wafer, the computer-implemented method comprising:
   receiving input variables comprising: a minimum die width ($x_{min}$), a minimum die height ($y_{min}$), a target aspect ratio, a target die area ($A_{target}$), a wafer area ($A_w$), an edge band width ($w_{eb}$), and a scribe width ($w_s$);
   executing a die number optimization (DNO) routine to determine a maximum number of dies ($N_{max}$) for the target die area ($A_{target}$), wherein the DNO routine comprises:
      iteratively checking each die shape in a first list of die shapes to determine which ones of the die shapes have a maximum number of dies ($N_{max}$) for the target die area ($A_{target}$), and
      generating an initial result list of die shapes that have the maximum number of dies ($N_{max}$) for the target die area ($A_{target}$);
   executing a die size optimization (DSO) routine to determine (1) a list of die shapes having a maximum die area ($A_{max}$) corresponding to the maximum number of dies ($N_{max}$), (2) a first list of optimized die shapes that have a maximum area utilization (AU) for a decreased target die area ($A_{target}$), and (3) a second list of optimized die shapes that have a minimum area utilization (AU) for an increased target die area ($A_{target}$);
   outputting a candidate list comprising a plurality of entries including die shapes from the initial result list that have the maximum number of dies ($N_{max}$) for the target die area ($A_{target}$), die shapes from the list of die shapes having the maximum die area ($A_{max}$) corresponding to the maximum number of dies ($N_{max}$), the optimized die shapes from the first list of optimized die shapes, and the optimized die shapes from the second list of optimized die shapes; and
   selecting one of the entries from the candidate list that will result in the maximum number of dies ($N_{max}$) on the wafer.

2. The computer-implemented method of claim 1, further comprising:
   computing a first maximum die width ($x_{max}$) and a first maximum die height ($y_{max}$), and
   generating the first list of die shapes that have the target die area ($A_{target}$), based on the minimum die width ($x_{min}$), the minimum die height ($y_{min}$), the maximum die width ($x_{max}$) and the maximum die height ($y_{max}$).

3. The computer-implemented method of claim 2, wherein the step of iteratively checking each die shape in the first list of die shapes to determine which ones of the die shapes have the maximum number of dies ($N_{max}$) for the target die area ($A_{target}$), comprises:
   (a) selecting a next die shape from the first list of die shapes as a current die shape, and computing a first number (Ni) of dies for the current die shape from the first list of die shapes; and
   (b) determining whether the computed number (Ni) of dies for the current die shape is greater than or equal to a current maximum die number ($N_{max}$) stored in a result list, and
   the method further comprising:
   when the computed first number (Ni) of dies for the current die shape is equal to the current maximum die number ($N_{max}$) stored in the result list, then (c) adding the computed first number (Ni) of dies for the current die shape, the current die shape and a current aspect ratio of the current die shape to the result list, and then (e) determining whether all die shapes in the first list of die shapes have been evaluated;
   when the computed first number (Ni) of dies for the current die shape is greater than the current maximum die number ($N_{max}$) stored in the result list, then (d) clearing the result list and adding the computed first number (Ni) of dies for the current die shape, the current die shape and the current aspect ratio of the current die shape to the result list, and then (e) determining whether all die shapes in the first list of die shapes have been evaluated;
   when the computed first number (Ni) of dies for the current die shape is not greater than the current maximum die number ($N_{max}$) stored in the result list, then (e) determining whether all die shapes in the first list of die shapes have been evaluated;

if all die shapes in the first list of die shapes have not yet been evaluated at step (e), iteratively repeating steps (a) through (e);

after all die shapes in the first list of die shapes have been evaluated at step (e), recording the result list as a final result list, wherein the final result list comprises a plurality of entries, each entry comprising: a particular die shape for that entry, the maximum number of dies ($N_{max}$), and a particular aspect ratio for that entry, wherein the aspect ratio of each entry in the final result list is different.

4. The computer-implemented method of claim 1, wherein the DSO routine comprises a first DSO routine, the first DSO routine comprising:

determining, while holding the maximum number of dies ($N_{max}$) determined during the DNO routine at a fixed number, the maximum die area ($A_{max}$) corresponding to the maximum number of dies ($N_{max}$).

5. The computer-implemented method of claim 4, wherein the step of determining, while holding the maximum number of dies ($N_{max}$) determined during the DNO routine at the fixed number, the maximum die area ($A_{max}$) corresponding to the maximum number of dies ($N_{max}$), comprises:

multiplying the target die area ($A_{target}$) by a first scaling factor to compute an upper limit die area ($A_{ul}$) based on the target die area ($A_{target}$), and then computing, based on the upper limit die area ($A_{ul}$), the minimum die width ($x_{min}$) and the minimum die height ($y_{min}$), a second maximum die width ($x_{max}'$) and a second maximum die height ($y_{max}'$); and generating a second list of die shapes that have an upper limit die area ($A_{ul}$), based on the minimum die width ($x_{min}$), the minimum die height ($y_{min}$), the second maximum die width ($x_{max}'$) and the second maximum die height ($y_{max}'$).

6. The computer-implemented method of claim 5, further comprising:

(f) selecting a next die shape from the second list of die shapes as a current die shape, and computing a second number (Nu) of dies for the current die shape from the second list of die shapes;

(g) determining whether the computed second number (Nu) of dies for the current die shape is equal to the maximum number of dies ($N_{max}$) computed by the DNO routine;

when the computed second number (Nu) of dies for the current die shape is determined to be not equal to the maximum number of dies ($N_{max}$) that was computed during the DNO routine, (j) determining whether all die shapes in the second list of die shapes have been evaluated;

when the computed second number (Nu) of dies for the current die shape is determined to be equal to the maximum number of dies ($N_{max}$) that was computed during the DNO routine, then (h) determining whether current die area has increased in comparison to the target die area ($A_{target}$) when using the current die shape;

when the current die area is determined not to have increased in comparison to the target die area ($A_{target}$) when using the current die shape, then (j) determining whether all die shapes in the second list of die shapes have been evaluated;

when the current die area is determined to have increased in comparison to the target die area ($A_{target}$) when using the current die shape, then (i) storing the current die shape as a first result in the list of die shapes having the maximum die area ($A_{max}$) and corresponding to the maximum number of dies ($N_{max}$); and then (j) determining whether all die shapes in the second list of die shapes have been evaluated;

when it is determined at step (j) that all die shapes in the second list of die shapes have not yet been evaluated, iteratively repeating steps (f) through (j);

when it is determined at step (j) that all die shapes in the second list of die shapes have been evaluated, recording the list of die shapes having the maximum die area ($A_{max}$) that that corresponds to the maximum number of dies ($N_{max}$) computed during the DNO routine.

7. The computer-implemented method of claim 4, wherein the DSO routine comprises a second DSO routine, the second DSO routine comprising:

decreasing the target die area ($A_{target}$) to generate a decreased target die area ($A_{target}$), and then determining the first list of optimized die shapes, which have the maximum area utilization (AU), for the decreased target die area ($A_{target}$).

8. The computer-implemented method of claim 7, wherein decreasing the target die area ($A_{target}$) to generate the decreased target die area ($A_{target}$), comprises:

multiplying the target die area ($A_{target}$) by a second scaling factor to compute lower limit die area ($A_{ll}$) based on the target die area ($A_{target}$), and then computing, based on the lower limit die area ($A_{ll}$), the minimum die width ($x_{min}$) and the minimum die height ($y_{min}$), a third maximum die width ($x_{max}''$) and a third maximum die height ($y_{max}''$); and generating a third list of die shapes that have the lower limit die area ($A_{ll}$), based on the minimum die width ($x_{min}$), the minimum die height ($y_{min}$), the third maximum die width ($x_{max}''$) and the third maximum die height ($y_{max}''$).

9. The computer-implemented method of claim 8, wherein the step of then determining the first list of optimized die shapes, which have the maximum area utilization (AU), for the decreased target die area ($A_{target}$), comprises:

(k) selecting a next die shape from the third list of die shapes as a current die shape, and computing a third number (Nl) of dies for the current die shape in the third list of die shapes;

(l) computing a first area utilization value for the current die shape;

(m) determining whether the first area utilization value or the computed third number (Nl) of dies for the current die shape has increased from previously stored values;

when it is determined, at step (m), that neither the first area utilization value nor the computed third number (Nl) of dies for the current die shape has increased from previously stored values, (o) determining whether all die shapes in the third list of die shapes have been evaluated;

when it is determined, at step (m), that either the first area utilization value or the computed third number (Nl) of dies for the current die shape has increased from previously stored values, (n) storing the current die area associated with the current die shape as a second result; and then (o) determining whether all die shapes in the third list of die shapes have been evaluated;

when it is determined at step (o) that all die shapes in the third list of die shapes have not yet been evaluated, iteratively repeating steps (k) through (n);

when it is determined at step (o) that all die shapes in the third list of die shapes have been evaluated, recording the second results that are presently stored as the first list of optimized die shapes, which have the maximum area utilization (AU), for the decreased target die area ($A_{target}$).

10. The computer-implemented method of claim 4, wherein the DSO routine comprises a third DSO routine, the third DSO routine comprising:
- (p) selecting a next die shape from the second list of die shapes as a current die shape, and computing a fourth number (Nu') of dies for the current die shape from the second list of die shapes;
- (q) computing a second area utilization value for the current die shape;
- (r) determining whether the second area utilization value for the current die shape has decreased from a previously stored value;
- when it is determined, at step (r), that the second area utilization value for the current die shape has not decreased from the previously stored value, (t) determining whether all die shapes in the second list of die shapes have been evaluated;
- when it is determined, at step (r), that the second area utilization value for the current die shape has decreased from the previously stored value, (s) storing the current die area associated with the current die shape as a third result; and then (t) determining whether all die shapes in the second list of die shapes have been evaluated;
- when it is determined at step (r) that all die shapes in the second list of die shapes have not yet been evaluated, iteratively repeating steps (p) through (t);
- when it is determined at step (t) that all die shapes in the second list of die shapes have been evaluated, recording the third results that are presently stored as the second list of optimized die shapes, which have the minimum area utilization (AU), for the increased target die area $(A_{target})$.

11. The computer-implemented method of claim 1, further comprising:
- displaying a proposed wafer layout corresponding to one of the entries from the candidate list, wherein the proposed wafer layout comprises a suggested die area $(x_s \cdot y_s)$, a suggested die height $(x_s)$, a suggested die width $(y_s)$, a suggested die aspect ratio $(x_s/y_s)$, and the maximum number of dies $(N_{max})$.

12. A system for performing electronic design automation tasks including optimizing a number of dies that can be fabricated on a wafer, the system comprising:
- a processor;
- a memory coupled to the processor;
- an input apparatus for inputting input variables, the input variables including a minimum die width $(x_{min})$, a minimum die height $(y_{min})$, a target aspect ratio, a step size, a target die area $(A_{target})$, a wafer area $(A_w)$, an edge band width $(w_{eb})$, and a scribe width $(w_s)$; and
- a computer program having a plurality of software modules, including:
  - a first module configured to compute a first maximum die width $(x_{max})$ and a first maximum die height $(y_{max})$, to generate a first list of die shapes that have the target die area $(A_{target})$, based on the minimum die width $(x_{min})$, the minimum die height $(y_{min})$, the maximum die width $(x_{max})$ and the maximum die height $(y_{max})$, to determine a maximum number of dies $(N_{max})$ for the target die area $(A_{target})$ by iteratively checking each die shape in a first list of die shapes to determine which ones of the die shapes have the maximum number of dies $(N_{max})$ for the target die area $(A_{target})$, and to generate an initial result list of die shapes that have the maximum number of dies $(N_{max})$ for the target die area $(A_{target})$;
  - a second module configured to determine (1) a list of die shapes having a maximum die area $(A_{max})$ corresponding to the maximum number of dies $(N_{max})$, (2) a first list of optimized die shapes, which have a maximum area utilization (AU), for a decreased target die area $(A_{target})$, and (3) a second list of optimized die shapes, which have a minimum area utilization (AU), for an increased target die area $(A_{target})$; and
  - a third module that generates a candidate list comprising a plurality of entries, wherein the plurality of entries comprise: die shapes from the initial result list that have the maximum number of dies $(N_{max})$ for the target die area $(A_{target})$, die shapes from the list of die shapes having the maximum die area $(A_{max})$ corresponding to the maximum number of dies $(N_{max})$, the optimized die shapes from the first list of optimized die shapes, and the optimized die shapes from the second list of optimized die shapes.

13. The system of claim 12, wherein iteratively checking each die shape in the first list of die shapes to determine which ones of the die shapes have the maximum number of dies $(N_{max})$ for the target die area $(A_{target})$, comprises:
- (a) selecting a next die shape from the first list of die shapes as a current die shape, and computing a first number (Ni) of dies for the current die shape from the first list of die shapes;
- (b) determining whether the computed number (Ni) of dies for the current die shape is greater than or equal to a current maximum die number $(N_{max})$ stored in a result list;
- when the computed first number (Ni) of dies for the current die shape is equal to the current maximum die number $(N_{max})$ stored in the result list, then (c) adding the computed first number (Ni) of dies for the current die shape, the current die shape and a current aspect ratio of the current die shape to the result list, and then (e) determining whether all die shapes in the first list of die shapes have been evaluated;
- when the computed first number (Ni) of dies for the current die shape is greater than the current maximum die number $(N_{max})$ stored in the result list, then (d) clearing the result list and adding the computed first number (Ni) of dies for the current die shape, the current die shape and the current aspect ratio of the current die shape to the result list, and then (e) determining whether all die shapes in the first list of die shapes have been evaluated;
- when the computed first number (Ni) of dies for the current die shape is not greater than the current maximum die number $(N_{max})$ stored in the result list, then (e) determining whether all die shapes in the first list of die shapes have been evaluated;
- when it is determined that all die shapes in the first list of die shapes have not yet been evaluated at step (e), iteratively repeating steps (a) through (e);
- when it is determined that all die shapes in the first list of die shapes have been evaluated at step (e), recording the result list as a final result list, wherein the final result list comprises a plurality of entries, wherein each entry comprises: a particular die shape for that entry, the maximum number of dies $(N_{max})$, and a particular aspect ratio for that entry, wherein the aspect ratio of each entry in the final result list is different.

14. The system of claim 12, wherein the second module is configured to determine the list of die shapes having the maximum die area $(A_{max})$ corresponding to the maximum number of dies $(N_{max})$ while holding the maximum number of dies $(N_{max})$ at a fixed number by:

multiplying the target die area ($A_{target}$) by a first scaling factor to compute an upper limit die area ($A_{ul}$) based on the target die area ($A_{target}$), and then computing, based on the upper limit die area ($A_{ul}$), the minimum die width ($x_{min}$) and the minimum die height ($y_{min}$), a second maximum die width ($x_{max}'$) and a second maximum die height ($y_{max}'$);

generating a second list of die shapes that have the upper limit die area ($A_{ul}$), based on the minimum die width ($x_{min}$), the minimum die height ($y_{min}$), the second maximum die width ($x_{max}'$) and the second maximum die height ($y_{max}'$);

(f) selecting a next die shape from the second list of die shapes as a current die shape, and computing a second number (Nu) of dies for the current die shape from the second list of die shapes;

(g) determining whether the computed second number (Nu) of dies for the current die shape is equal to the maximum number of dies ($N_{max}$);

when the computed second number (Nu) of dies for the current die shape is determined to be not equal to the maximum number of dies ($N_{max}$), (j) determining whether all die shapes in the second list of die shapes been evaluated;

when the computed second number (Nu) of dies for the current die shape is determined to be equal to the maximum number of dies ($N_{max}$), then (h) determining whether current die area has increased in comparison to the target die area ($A_{target}$) when using the current die shape;

when the current die area is determined not to have increased in comparison to the target die area ($A_{target}$) when using the current die shape, then (j) determining whether all die shapes in the second list of die shapes been evaluated;

when the current die area is determined to have increased in comparison to the target die area ($A_{target}$) when using the current die shape, then (i) storing the current die shape as a first result in the list of die shapes having the maximum die area ($A_{max}$) and corresponding to the maximum number of dies ($N_{max}$); and then (j) determining whether all die shapes in the second list of die shapes have been evaluated;

when it is determined at step (j) that all die shapes in the second list of die shapes have not yet been evaluated, iteratively repeating steps (f) through (j);

when it is determined at step (j) that all die shapes in the second list of die shapes have been evaluated, recording the list of die shapes having the maximum die area ($A_{max}$) that that corresponds to the maximum number of dies ($N_{max}$).

15. The system of claim 12, wherein the second module is configured to determine the first list of optimized die shapes, which have the maximum area utilization (AU), for the decreased target die area ($A_{target}$) by:

multiplying the target die area ($A_{target}$) by a second scaling factor to compute lower limit die area ($A_{ll}$) based on the target die area ($A_{target}$), and then computing, based on the lower limit die area ($A_{ll}$), the minimum die width ($x_{min}$) and the minimum die height ($y_{min}$), a third maximum die width ($x_{max}''$) and a third maximum die height ($y_{max}''$);

generating a third list of die shapes that have the lower limit die area ($A_{ll}$), based on the minimum die width ($x_{min}$), the minimum die height ($y_{min}$), the third maximum die width ($x_{max}''$) and the third maximum die height ($y_{max}''$);

(k) selecting a next die shape from the third list of die shapes as a current die shape, and computing a third number (Nl) of dies for the current die shape in the third list of die shapes;

(l) computing a first area utilization value for the current die shape;

(m) determining whether the first area utilization value or the computed third number (Nl) of dies for the current die shape has increased from previously stored values;

when it is determined, at step (m), that neither the first area utilization value nor the computed third number (Nl) of dies for the current die shape has increased from previously stored values, (o) determining whether all die shapes in the third list of die shapes have been evaluated;

when it is determined, at step (m), that either the first area utilization value or the computed third number (Nl) of dies for the current die shape has increased from previously stored values, (n) storing the current die area associated with the current die shape as a second result; and then (o) determining whether all die shapes in the third list of die shapes have been evaluated;

when it is determined at step (o) that all die shapes in the third list of die shapes have not yet been evaluated, iteratively repeating steps (k) through (n);

when it is determined at step (o) that all die shapes in the third list of die shapes have been evaluated, recording the second results that are presently stored as the first list of optimized die shapes, which have the maximum area utilization (AU), for the decreased target die area ($A_{target}$).

16. The system of claim 12, wherein the second module is configured to determine (the second list of optimized die shapes, which have the minimum area utilization (AU), for the increased target die area ($A_{target}$) by:

(p) selecting a next die shape from the second list of die shapes as a current die shape, and computing a fourth number (Nu') of dies for the current die shape from the second list of die shapes;

(q) computing a second area utilization value for the current die shape;

(r) determining whether the second area utilization value for the current die shape has decreased from a previously stored value;

when it is determined, at step (r), that the second area utilization value for the current die shape has not decreased from the previously stored value, (t) determining whether all die shapes in the second list of die shapes have been evaluated;

when it is determined, at step (r), that the second area utilization value for the current die shape has decreased from the previously stored value, (s) storing the current die area associated with the current die shape as a third result; and then (t) determining whether all die shapes in the second list of die shapes have been evaluated;

when it is determined at step (r) that all die shapes in the second list of die shapes have not yet been evaluated, iteratively repeating steps (p) through (t);

when it is determined at step (t) that all die shapes in the second list of die shapes have been evaluated, recording the third results that are presently stored as the second list of optimized die shapes, which have the minimum area utilization (AU), for the increased target die area ($A_{target}$).

17. The system of claim 12, further comprising:
a display for displaying at least one of:
a proposed wafer layout corresponding to one of the entries from the candidate list, the proposed wafer layout comprising: a suggested die area ($x_s \cdot y_s$), a suggested die height ($x_s$), a suggested die width ($y_s$), a suggested die aspect ratio ($x_s/y_s$), and the maximum number of dies ($N_{max}$); and an image that includes a wafer having the proposed wafer layout.

18. A computer program product for use with a computer, the computer program product comprising a non-transitory computer-readable storage medium comprising computer-executable instructions stored thereon for optimizing a number of dies that can be fabricated on a wafer, the computer-executable instructions performing steps comprising:

receiving input variables comprising: a minimum die width ($x_{min}$), a minimum die height ($y_{min}$), a target aspect ratio, a step size, a target die area ($A_{target}$), a wafer area ($A_w$), an edge band width ($w_{eb}$), and a scribe width ($w_s$); and executing a die number optimization (DNO) routine to compute a first maximum die width ($x_{max}$) and a first maximum die height ($y_{max}$), to generate a first list of die shapes that have the target die area ($A_{target}$), based on the minimum die width ($x_{min}$), the minimum die height ($y_{min}$), the maximum die width ($x_{max}$) and the maximum die height ($y_{max}$), and to determine a maximum number of dies ($N_{max}$) for the target die area ($A_{target}$), wherein the DNO routine comprises: iteratively checking each die shape in a first list of die shapes to determine which ones of the die shapes have the maximum number of dies ($N_{max}$) for the target die area ($A_{target}$); and executing a die size optimization (DSO) routine to determine (1) a list of die shapes having a maximum die area ($A_{max}$) corresponding to the maximum number of dies ($N_{max}$), (2) a first list of optimized die shapes, which have a maximum area utilization (AU), for a decreased target die area ($A_{target}$), and (3) a second list of optimized die shapes, which have a minimum area utilization (AU), for an increased target die area ($A_{target}$), wherein the DSO routine comprises a first DSO routine comprising:

determining, while holding the maximum number of dies ($N_{max}$) determined during the DNO routine at a fixed number, the maximum die area ($A_{max}$) corresponding to the maximum number of dies ($N_{max}$), by:

multiplying the target die area ($A_{target}$) by a first scaling factor to compute an upper limit die area ($A_{ul}$) based on the target die area ($A_{target}$), and then computing, based on the upper limit die area ($A_{ul}$), the minimum die width ($x_{min}$) and the minimum die height ($y_{min}$), a second maximum die width ($x_{max}'$) and a second maximum die height ($y_{max}'$); and generating a second list of die shapes that have the upper limit die area ($A_{ul}$), based on the minimum die width ($x_{min}$), the minimum die height ($y_{min}$), the second maximum die width ($x_{max}'$) and the second maximum die height ($y_{max}'$).

19. A computer program product according to claim 18, wherein the step of iteratively checking each die shape in the first list of die shapes to determine which ones of the die shapes have the maximum number of dies ($N_{max}$) for the target die area ($A_{target}$), comprises:

(a) selecting a next die shape from the first list of die shapes as a current die shape, and computing a first number (Ni) of dies for the current die shape from the first list of die shapes;

(b) determining whether the computed number (Ni) of dies for the current die shape is greater than or equal to a current maximum die number ($N_{max}$) stored in a result list;

when the computed first number (Ni) of dies for the current die shape is equal to the current maximum die number ($N_{max}$) stored in the result list, then (c) adding the computed first number (Ni) of dies for the current die shape, the current die shape and a current aspect ratio of the current die shape to the result list, and then (e) determining whether all die shapes in the first list of die shapes have been evaluated;

when the computed first number (Ni) of dies for the current die shape is greater than the current maximum die number ($N_{max}$) stored in the result list, then (d) clearing the result list and adding the computed first number (Ni) of dies for the current die shape, the current die shape and the current aspect ratio of the current die shape to the result list, and then (e) determining whether all die shapes in the first list of die shapes have been evaluated;

when the computed first number (Ni) of dies for the current die shape is not greater than the current maximum die number ($N_{max}$) stored in the result list, then (e) determining whether all die shapes in the first list of die shapes have been evaluated;

when it is determined that all die shapes in the first list of die shapes have not yet been evaluated at step (e), iteratively repeating steps (a) through (e);

when it is determined that all die shapes in the first list of die shapes have been evaluated at step (e), recording the result list as a final result list, wherein the final result list comprises a plurality of entries, wherein each entry comprises: a particular die shape for that entry, the maximum number of dies ($N_{max}$), and a particular aspect ratio for that entry, wherein the aspect ratio of each entry in the final result list is different.

20. A computer program product according to claim 18, wherein the computer-executable instructions perform steps comprising further comprising:

(f) selecting a next die shape from the second list of die shapes as a current die shape, and computing a second number (Nu) of dies for the current die shape from the second list of die shapes;

(g) determining whether the computed second number (Nu) of dies for the current die shape is equal to the maximum number of dies ($N_{max}$) that was computed during the DNO routine;

when the computed second number (Nu) of dies for the current die shape is determined to be not equal to the maximum number of dies ($N_{max}$) that was computed during the DNO routine, (j) determining whether all die shapes in the second list of die shapes have been evaluated;

when the computed second number (Nu) of dies for the current die shape is determined to be equal to the maximum number of dies ($N_{max}$) that was computed during the DNO routine, then (h) determining whether current die area has increased in comparison to the target die area ($A_{target}$) when using the current die shape;

when the current die area is determined not to have increased in comparison to the target die area ($A_{target}$) when using the current die shape, then (j) determining whether all die shapes in the second list of die shapes have been evaluated;

when the current die area is determined to have increased in comparison to the target die area ($A_{target}$) when using the current die shape, then (i) storing the current die shape as a first result in the list of die shapes having the maximum die area ($A_{max}$) and corresponding to the maximum number of dies ($N_{max}$); and then (j) determining whether all die shapes in the second list of die shapes have been evaluated;

when it is determined at step (j) that all die shapes in the second list of die shapes have not yet been evaluated, iteratively repeating steps (f) through (j);

when it is determined at step (j) that all die shapes in the second list of die shapes have been evaluated, recording the list of die shapes having the maximum die area ($A_{max}$) that that corresponds to the maximum number of dies ($N_{max}$) computed during the DNO routine.

21. A computer program product according to claim 18, wherein the DSO routine comprises a second DSO routine, the second DSO routine comprising:

decreasing the target die area ($A_{target}$) to generate a decreased target die area ($A_{target}$), and then determining the first list of optimized die shapes, which have the maximum area utilization (AU), for the decreased target die area ($A_{target}$).

22. A computer program product according to claim 21, wherein decreasing the target die area ($A_{target}$) to generate the decreased target die area ($A_{target}$), comprises:

multiplying the target die area ($A_{target}$) by a second scaling factor to compute lower limit die area ($A_{ll}$) based on the target die area ($A_{target}$), and then computing, based on the lower limit die area ($A_{ll}$), the minimum die width ($x_{min}$) and the minimum die height ($y_{min}$), a third maximum die width ($x_{max}"$) and a third maximum die height ($y_{max}"$); and generating a third list of die shapes that have the lower limit die area ($A_{ll}$), based on the minimum die width ($x_{min}$), the minimum die height ($y_{min}$), the third maximum die width ($x_{max}"$) and the third maximum die height ($y_{max}"$).

23. A computer program product according to claim 22, wherein the step of then determining the first list of optimized die shapes, which have the maximum area utilization (AU), for the decreased target die area ($A_{target}$), comprises:

(k) selecting a next die shape from the third list of die shapes as a current die shape, and computing a third number (Nl) of dies for the current die shape in the third list of die shapes;

(l) computing a first area utilization value for the current die shape;

(m) determining whether the first area utilization value or the computed third number (Nl) of dies for the current die shape has increased from previously stored values;

when it is determined, at step (m), that neither the first area utilization value nor the computed third number (Nl) of dies for the current die shape has increased from previously stored values, (o) determining whether all die shapes in the third list of die shapes have been evaluated;

when it is determined, at step (m), that either the first area utilization value or the computed third number (Nl) of dies for the current die shape has increased from previously stored values, (n) storing the current die area associated with the current die shape as a second result; and then (o) determining whether all die shapes in the third list of die shapes have been evaluated;

when it is determined at step (o) that all die shapes in the third list of die shapes have not yet been evaluated, iteratively repeating steps (k) through (n);

when it is determined at step (o) that all die shapes in the third list of die shapes have been evaluated, recording the second results that are presently stored as the first list of optimized die shapes, which have the maximum area utilization (AU), for the decreased target die area ($A_{target}$).

24. A computer program product according to claim 21, wherein the DSO routine comprises a third DSO routine, the third DSO routine comprising:

(p) selecting a next die shape from the second list of die shapes as a current die shape, and computing a fourth number (Nu') of dies for the current die shape from the second list of die shapes;

(q) computing a second area utilization value for the current die shape;

(r) determining whether the second area utilization value for the current die shape has decreased from a previously stored value;

when it is determined, at step (r), that the second area utilization value for the current die shape has not decreased from the previously stored value, (t) determining whether all die shapes in the second list of die shapes have been evaluated;

when it is determined, at step (r), that the second area utilization value for the current die shape has decreased from the previously stored value, (s) storing the current die area associated with the current die shape as a third result; and then (t) determining whether all die shapes in the second list of die shapes have been evaluated;

when it is determined at step (r) that all die shapes in the second list of die shapes have not yet been evaluated, iteratively repeating steps (p) through (t);

when it is determined at step (t) that all die shapes in the second list of die shapes have been evaluated, recording the third results that are presently stored as the second list of optimized die shapes, which have the minimum area utilization (AU), for the increased target die area ($A_{target}$).

* * * * *